(12) United States Patent
Nakamura

(10) Patent No.: US 7,741,380 B2
(45) Date of Patent: *Jun. 22, 2010

(54) INK COMPOSITION, INK JET RECORDING METHOD, METHOD FOR PRODUCING PLANOGRAPHIC PRINTING PLATE AND PLANOGRAPHIC PRINTING PLATE

(75) Inventor: Ippei Nakamura, Shizuoka-ken (JP)

(73) Assignee: FUJIFILM Corporation, Tokyo (JP)

( * ) Notice: Subject to any disclaimer, the term of this patent is extended or adjusted under 35 U.S.C. 154(b) by 844 days.

This patent is subject to a terminal disclaimer.

(21) Appl. No.: 11/527,544

(22) Filed: Sep. 27, 2006

(65) Prior Publication Data

US 2007/0071953 A1 Mar. 29, 2007

(30) Foreign Application Priority Data

| Sep. 27, 2005 | (JP) | ............ 2005-280814 |
| Sep. 27, 2005 | (JP) | ............ 2005-280968 |
| Sep. 29, 2005 | (JP) | ............ 2005-285270 |
| Jun. 26, 2006 | (JP) | ............ 2006-175474 |

(51) Int. Cl.

| C08F 2/50 | (2006.01) |
| C08J 3/28 | (2006.01) |
| G03C 1/00 | (2006.01) |
| G03C 1/72 | (2006.01) |
| G03C 1/73 | (2006.01) |
| G03C 1/74 | (2006.01) |
| G03F 7/004 | (2006.01) |
| G03F 7/028 | (2006.01) |
| G03F 7/26 | (2006.01) |

(52) U.S. Cl. ............ 522/182; 522/71; 522/74; 522/150; 522/151; 522/153; 522/154; 522/173; 522/174; 522/175; 522/177; 522/178; 522/183; 106/31.13; 106/31.6; 430/287.1; 430/281.1; 430/288.1; 430/302; 430/325; 430/906; 430/910; 430/914; 430/916; 427/508; 427/510; 427/511; 427/514; 427/517; 427/466; 427/469

(58) Field of Classification Search ............ 522/71, 522/74, 150, 151, 154, 153, 173, 174, 175, 522/177, 178, 182, 183; 106/31.13, 31.6; 427/508, 510, 511, 514, 517, 466, 469; 430/281.1, 430/287.1, 288.1, 302, 914, 916, 944, 325, 430/910, 906

See application file for complete search history.

(56) References Cited

U.S. PATENT DOCUMENTS

| 4,003,751 | A | * | 1/1977 | Carder .................. 524/813 |
| 6,790,875 | B2 | * | 9/2004 | Noguchi et al. ........... 522/84 |
| 6,861,200 | B2 | * | 3/2005 | Oshima ................ 430/278.1 |
| 7,303,857 | B2 | * | 12/2007 | Goto ................... 430/281.1 |
| 7,338,748 | B2 | * | 3/2008 | Sugasaki et al. ....... 430/287.1 |
| 2002/0048725 | A1 | * | 4/2002 | Oshima ................ 430/283.1 |
| 2002/0065335 | A1 | * | 5/2002 | Noguchi et al. ........... 522/84 |
| 2003/0105201 | A1 | | 6/2003 | Auschra |
| 2004/0099170 | A1 | | 5/2004 | Takabayashi |
| 2007/0060665 | A1 | | 3/2007 | Nakamura |
| 2008/0250973 | A1 | * | 10/2008 | Leenders et al. ....... 106/31.92 |

FOREIGN PATENT DOCUMENTS

| EP | 1 176 467 A | 1/2002 |
| EP | 1 188 806 A2 | 3/2002 |
| EP | 1 275 689 A1 | 1/2003 |
| EP | 1 449 652 A2 | 8/2004 |
| JP | 2003-026711 A | 1/2003 |
| JP | 2003-192943 A | 7/2003 |
| JP | 2003-192944 A | 7/2003 |
| JP | 2003-246818 A | 9/2003 |

OTHER PUBLICATIONS

European Search Report dated Mar. 2, 2007.
European Search Report submitted on Feb. 15, 2007.

* cited by examiner

Primary Examiner—Sanza L McClendon
(74) Attorney, Agent, or Firm—Sughrue Mion, PLLC

(57) ABSTRACT

The invention provides (1) an ink composition including a polymerization initiator and at least one compound selected from the group consisting of (meth)acrylic acid and monofunctional (meth)acrylic acid esters and amides each having a carboxy group in the molecule, (2) an ink composition including a polymerization initiator, at least one compound selected from the group consisting of (meth)acrylic acid and monofunctional (meth)acrylic acid esters and amides each having a carboxy group in the molecule, and a monofunctional (meth) acrylic acid ester or amide having an alkylene oxide repeating unit in the molecule, and (3) an ink composition including a polymerization initiator and a monofunctional (meth)acrylic acid ester or amide having a basic group in the molecule; and an ink jet recording method, a method for producing a planographic printing plate and a planographic printing plate produced by the method for producing a planographic printing plate using the above-mentioned ink compositions.

20 Claims, No Drawings

INK COMPOSITION, INK JET RECORDING METHOD, METHOD FOR PRODUCING PLANOGRAPHIC PRINTING PLATE AND PLANOGRAPHIC PRINTING PLATE

CROSS-REFERENCE TO RELATED APPLICATION

This application claims priority under 35 U.S.C. 119 from Japanese Patent Application Nos. 2005-280814, 2005-280968, 2005-285270, and 2006-175474, the disclosures of which are incorporated by reference herein.

BACKGROUND

1. Technical Field

The invention relates to an ink composition suitably used for ink jet recording, an ink jet recording method, and a planographic printing plate obtained by using the ink composition, and a method for producing the same. More particularly, the invention relates to an ink composition that it is cured with high sensitivity by irradiation of active radiation rays to thus form a cured material having sufficient flexibility and is suitable for ink jet recording, an ink jet recording method, and a planographic printing plate obtained by using the ink composition and a method for producing the same.

2. Related Art

Examples of methods for forming an image on a recording medium such as paper based on an image data signal include an electrophotographic method, a sublimation-type thermal transfer method, a melt-type thermal transfer method, and an ink jet recording method. The electrophotographic method requires a process of forming an electrostatic latent image on a photoreceptor drum by charging and light exposure, and a system therefore becomes complicated, resulting in increased production cost. The thermal transfer method can be conducted by an inexpensive apparatus, but requires use of ink ribbons, leading to increased running cost and generation of waste.

The ink jet recording method can also be conducted by an inexpensive apparatus. Moreover, an image is directly formed by discharging ink only to regions of a support which are to be image regions, and the ink can therefore be efficiently used, resulting in reduced running cost. Further, ink jet recording apparatuses are not noisy. Accordingly, the ink jet recording method is an excellent image forming method.

There is a demand for an ink composition, such as an ink composition for ink jet recording, which cures by irradiation of active radiation rays such as ultraviolet rays with high sensitivity to form high-quality images (radiation-curable ink composition). Improvement in sensitivity of ink compositions with respect to irradiation of active radiation rays increases the curing property of the ink compositions, leading to reduced power consumption and reduced load applied to an active radiation ray generator, which lengthen the lifetime of the generator. Moreover, sufficient curing suppresses vaporization of uncured low-molecular weight substances and deterioration in strength of images formed. In addition, when the ink composition is used to form image regions of a planographic printing plate, improved strength of images due to improved sensitivity brings increased printing durability to the image regions.

An ink jet method involving UV curing has been attracting attention recently, since the method generates relatively weak odor and enables images to be recorded on recording media that do not have a quick drying property or an ink absorbing property. In such a method, benzil, benzoin, benzoin ethyl ether, Michler's ketone, anthraquinone, acridine, phenazine, benzophenone, or 2-ethylanthraquinone is generally used as a photopolymerization initiator (see Chemical Review, Vol. 93, pp. 435-448, written by Bruce M. Monroe et al., and published in 1993). However, a photopolymerizable composition including such a photopolymerization initiator, which has low sensitivity, requires a long time for image-wise exposure in forming images. Therefore, in a case where the image to be formed is minute, if there is slight vibration during the operation, images with good image quality cannot be obtained. Further, since a long exposure time is accompanied by an increase in energy radiation from the exposure light source, a measure against radiation of the great heat resulting therefrom is needed.

For the purpose of providing an ink composition that is highly safe, causes little skin irritation, has low sensitizing property, and allows printing of an image having strong adhesiveness even on a support (recording medium) on which it is usually difficult to form an image with high sensitivity with no ink bleeding by an ink jet recording method, compositions containing polymerizable compounds that are particular acrylate compounds have been proposed, (see, for example, Japanese Patent Application Laid-Open (JP-A) No. 2003-192943). However, since a polymer obtained by curing a multifunctional acrylate used to improve sensitivity has a highly cross-linked three-dimensional structure, an image obtained by curing an ink including such a multifunctional acrylate has deteriorated flexibility and impact resistance, and therefore easily cracks on the recording medium or peels off, and has deteriorated durability.

Conventionally, so-called PS plates each having an oleophilic photosensitive resin layer on a hydrophilic support are used, and the photosensitive resin layer is image-wise exposed to light to form exposed regions having increased or decreased solubility in an alkaline developing solution, and non-image regions are dissolved in the alkaline developing solution and removed in preparing planographic printing plates. However, along with recent broad dissemination of digitization technology in which image information is electronically processed, stored and output with a computer, there is a need for a new image output method that corresponds to the digitization technology. In particular, methods of producing a printing plate without use of a developing solution are under study, and a method in which a planographic printing plate is directly prepared by using an ink composition for ink jet recording has been proposed (see, for example, JP-A No. S54-117203). In this method, a printing plate with a desired image, which is preferably hydrophobic, is formed by image-wise discharging an ink on the surface of a support, which is preferably hydrophilic, in an ink jet recording manner and irradiating the ink with active radiation rays to cure the ink. In order to form image regions of a planographic printing plate, it is preferred that ink droplets deposited on the support cure rapidly without bleeding, the cured image regions have excellent strength and strong adhesiveness to the support, and, when the planographic printing plate is being loaded in a printing machine, the image regions conform to the deformation of the support without generation of damage such as cracks. Accordingly, there is currently a need for an ink composition suitable for such application.

Thus, there is a need for an ink composition that is cured with high sensitivity by irradiation of active radiation rays and, when cured, provides a high-quality and sufficiently flexible image; and an ink jet recording method using the ink composition.

There is also a need for a planographic printing plate prepared by using an ink composition that can be cured with high sensitivity by irradiation of ultraviolet rays; and a method for producing such a planographic printing plate.

SUMMARY

The invention was made under the above circumstances.

The first aspect of the invention provides an ink composition including: a polymerization initiator; and at least one compound selected from the group consisting of (meth) acrylic acid and monofunctional (meth)acrylic acid esters and amides each having a carboxy group in a molecule.

The second aspect of the invention provides an ink composition including: a polymerization initiator; at least one compound selected from the group consisting of (meth) acrylic acid and monofunctional (meth)acrylic acid esters and amides each having a carboxy group in a molecule; and a monofunctional (meth)acrylic acid ester or amide having an alkylene oxide repeating unit in a molecule.

The third aspect of the invention provides an ink composition including: a polymerization initiator; and a monofunctional (meth)acrylic acid ester or amide having a basic group in a molecule.

The fourth aspect of the invention provides an ink jet recording method, including: (a) discharging any one of those ink compositions onto a recording medium; and (b) irradiating the ink composition with active radiation rays to cure the ink composition.

The fifth aspect of the invention provides a method for producing a planographic printing plate, including: (a) discharging any of those ink compositions onto a hydrophilic support; and (b) irradiating the ink composition with active radiation rays to cure the ink composition to form a hydrophobic image on the hydrophilic support.

The sixth aspect of the invention provides a planographic printing plate, which is produced by the method of the fifth aspect.

DETAILED DESCRIPTION

<Ink Composition>

The ink composition according to the first aspect of the invention includes at least one polymerization initiator and at least one compound, which is referred to as a carboxy group-containing polymerizable compound in some cases, selected from the group consisting of (meth)acrylic acid and monofunctional (meth)acrylic acid esters and amides each having at least one carboxy group in the molecule thereof.

The effects of the first aspect of the invention have not become clear, but are supposedly thought to be as follows.

Since at least one compound obtained by introducing a carboxy group serving as a strong hydrogen-bonding unit into (meth)acrylic acid ester or (meth)acrylic acid amide serving as a monofunctional polymerizable monomer is used as a polymerizable compound, a hydrogen-bonding interaction shown below is formed between the carboxy groups of adjacent monomer molecules, and the monomer molecules function just like a bifunctional monomer. Therefore, it is thought that a decrease in a curing speed, which is a disadvantage of a monofunctional monomer, is suppressed to allow curing with high sensitivity by irradiation of radiation. Further, bonds due to such interaction are not strong, unlike covalent bonds obtained by curing ordinary multifunctional monomers. Therefore, a film obtained through the curing has superior flexibility to that of a film obtained by curing the multifunctional monomer.

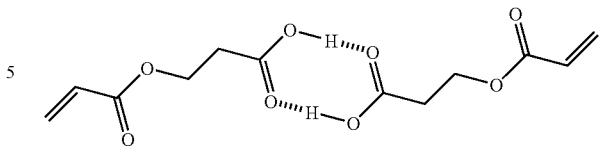

The ink composition according to the second aspect of the invention includes at least one polymerization initiator, at least one compound selected from the group consisting of (meth)acrylic acid and monofunctional (meth)acrylic acid esters and amides each having at least one carboxy group in the molecule thereof, and at least one of monofunctional (meth)acrylic acid esters and amides each having an alkylene oxide repeating unit in the molecule thereof.

The effects of the second aspect of the invention have not become clear, but are supposedly thought to be as follows.

In the second aspect of the invention, at least one compound selected from the group consisting of (meth)acrylic acid and monofunctional (meth)acrylic acid esters and amides each having at least one carboxy group in the molecule thereof, and at least one of monofunctional (meth) acrylic acid esters and amides each having an alkylene oxide repeating unit in the molecule thereof are used as polymerizable compounds. As the curing of these polymerizable compounds proceeds, many carboxy groups and alkylene oxide moieties physically become dense and low mobile. In this state, interaction between the carboxy group and the alkylene oxide occurs. It is thought that the interaction suppresses a decrease in a curing speed to allow curing with high sensitivity by irradiation of radiation.

Further, the interaction between the carboxy group and the alkylene oxide moiety is maintained even in a film obtained through the curing reaction. The interaction itself is weak, but the interactions between the carboxy groups and the alkylene oxide moieties are densely formed in the film, thereby improving the strength of the film. Further, such interaction is not strong, unlike covalent bonds obtained by curing ordinary multifunctional monomers. Therefore, a film obtained through the curing has superior flexibility to that of a film obtained by curing the multifunctional monomer.

The ink composition according to the third aspect of the invention includes at least one polymerization initiator, and at least one of monofunctional (meth)acrylic acid esters and amides each having at least one basic group in the molecule thereof (hereinafter, referred to as a "basic group-containing monofunctional (meth)acrylic acid derivative" in some cases). The ink composition according to the third aspect of the invention may further includes at least one compound selected from the group consisting of (meth)acrylic acid and monofunctional (meth)acrylic acid esters and amides each having at least one acidic group in the molecule thereof (hereinafter, referred to as an "acidic group-containing monofunctional (meth)acrylic acid derivative" in some cases).

The effects in the case of the ink composition according to the third aspect of the invention have not become clear, but are supposedly thought to be as follows.

In this case, the basic group-containing monofunctional (meth)acrylic acid derivative(s) is used as at least one polymerizable compound. The basic group-containing monofunctional (meth)acrylic acid derivative functions as a monofunctional polymerizable monomer. The basic group contained in the derivative molecule can trap oxygen contained in a system, and reduce polymerization inhibition that is caused by oxygen. Thereby, the monofunctional (meth)

acrylic acid derivative efficiently causes polymerization and allows the progress of the polymerization. Therefore, even when the ink composition does not contain a large amount of a multifunctional polymerizable compound, a good cured film that is not wet can be formed by irradiating the ink composition with light. The formed film has excellent flexibility, since the ink composition mainly includes multifunctional monomer.

It is thought that such a function of the monofunctional (meth)acrylic acid derivative suppresses a decrease in a curing speed, which is a disadvantage of monofunctional monomers, to allow curing with high sensitivity by irradiation of radiation in the invention.

Further, such a function attains both suppression of a decrease in a curing speed and good flexibility of a cured film in the invention.

In addition, when the ink composition of the third aspect further includes the acidic group-containing monofunctional (meth)acrylic acid derivative as well as the basic group-containing monofunctional (meth)acrylic acid derivative, acid-base interaction can be formed between adjacent monomer molecules. Thereby, these monofunctional (meth)acrylic acid derivatives function as pseudo-bifunctional monomers, and can further improve a curing speed. In this case, the acid-base interaction is not strong, unlike covalent bonds obtained by curing ordinary multifunctional monomers. Therefore, a film obtained through the curing has superior flexibility to that of a film obtained by curing an ink composition including a large amount of a multifunctional monomer.

Hereinafter, a mixture of the acidic group-containing monofunctional (meth)acrylic acid derivative(s) and the basic group-containing monofunctional (meth)acrylic acid derivative(s) is referred to as a "mixture of specific monofunctional (meth)acrylic acid derivatives" in some cases.

When a colored image is formed by using the ink composition of the invention, the ink composition of the invention can further include at least one colorant. The ink composition of the invention is suitable for ink jet recording, since it is cured with high sensitivity by irradiation of radiation to form a layer with improved flexibility.

Hereinafter, the ink composition of the invention will be described in detail.

1) Polymerization Initiator

The ink composition of the invention contains at least one polymerization initiator. Any one of known polymerization initiators may be used as each of the at least one polymerization initiator. The polymerization initiator is preferably a radical polymerization initiator in the invention.

The polymerization initiator used in the ink composition of the invention absorbs external energy to generate polymerization-initiating species. Examples of the external energy used to initiate polymerization are roughly classified into heat and radiation rays. For heat and radiation rays, a thermal polymerization initiator and a photopolymerization initiator are used respectively. Examples of the radiation rays include γ-rays, β-rays, electron beams, ultraviolet rays, visible rays, and infrared rays.

When irradiated with electron beams, the polymerizable compound may be cured in the absence of a polymerization initiator.

The thermal or photopolymerization initiator may be any one of known compounds such as the following compounds.

(1-1) Radical Polymerization Initiator

Typical examples of the radical polymerization initiator that can be preferably used in the invention include (a) aromatic ketones, (b) acylphosphine compounds, (c) aromatic onium salt compounds, (d) organic peroxides, (e) thio compounds, (f) hexaarylbiimidazole compounds, (g) ketoxime ester compounds, (h) borate compounds, (i) azinium compounds, (j) metallocene compounds, (k) active ester compounds, (l) compounds containing at least one carbon-halogen bond, and (m) alkylamine compounds.

One of these radical polymerization initiators may be used alone, or two or more of them may be used together.

(1-2) Cationic Polymerization Initiator

As described later, when the ink composition of the invention further contains at least one cationic polymerizable compound, the ink composition preferably contains at least one cationic polymerization initiator.

In the invention, the cationic polymerization initiator (agent that optically generates acid) is preferably one of compounds used in chemically amplified photoresists or optical cationic polymerization (see pages 187 to 192 of *Organic Materials for Imaging* edited by The Japanese Research Association for Organic Electronics Materials and published by Bun-Shin Shuppan in 1993). Typical examples of the cationic polymerization initiator preferably usable in the invention include the following compounds.

First, $B(C_6F_5)_4^-$, $PF_6^-$, $AsF_6^-$, $SbF_6^-$, and $CF_3SO_3^-$ salts of aromatic onium compounds (e.g., diazonium, ammonium, iodonium, sulfonium, and phosphonium) can be used. Second, sulfonated compounds that generate sulfonic acid may be used. Third, halogenated compounds that optically generate hydrogen halides can be used. Fourth, iron-allene complexes may be used.

One of these cationic polymerization initiators may be used alone, or two or more of them can be used together in the invention.

The amount of the polymerization initiator is preferably 0.01 to 35 parts by mass, more preferably 0.1 to 30 parts by mass, and even more preferably 0.5 to 30 parts by mass, relative to 100 parts by mass of the carboxy group-containing polymerizable compound(s), the basic group-containing polymerizable compound(s), or the mixture of specific monofunctional (meth)acrylic acid derivatives, and, if any, other polymerizable compound(s).

When the ink composition of the invention further includes at least one sensitizing dye described later, the mass ratio of the polymerization initiator(s) to the sensitizing dye(s) is generally 200:1 to 1:200, preferably 50:1 to 1:50, and more preferably 20:1 to 1:5.

2) Acidic Group-Containing Monofunctional (Meth)acrylic Acid Derivative

The acidic group-containing monofunctional (meth) acrylic acid derivative in the third aspect of the invention is at least one compound selected from the group consisting of (meth)acrylic acid and monofunctional (meth)acrylic acid esters and amides each having at least one acidic group in the molecule thereof. The monofunctional (meth)acrylic acid esters and amides each having at least one acidic group in the molecule thereof serving as the acidic group-containing monofunctional (meth)acrylic acid derivative has one (meth) acrylic acid ester or amide and one or more acidic groups in the molecule, and otherwise there is no particular limit thereto.

Further, the acidic group-containing monofunctional (meth)acrylic acid derivative preferably 1 to 3 acidic groups, more preferably 1 or 2 acidic groups, and still more preferably one acidic group from the viewpoints of suppressing a decrease in a curing speed and improving flexibility of a film obtained by curing an ink composition including such a derivative or derivatives, due to acid-base interaction formed.

In the monofunctional (meth)acrylic acid esters and amides each having at least one acidic group in the molecule thereof, each of the at least one acidic group is preferably a functional group having $pK_a$ of less than 11 and a dissociable proton. However, the acidic group is preferably a carboxy group, a sulfonic group, a phenolic hydroxyl group, a phosphoric group, a phosphonic group, an aminosulfonyl group, or an active imide group as described in JP-A No. 2005-107112 from the viewpoints of interaction between the acidic group-containing monofunctional (meth)acrylic acid derivative and the basic group-containing monofunctional (meth)acrylic acid derivative described later and availability of the acidic group-containing monofunctional (meth)acrylic acid derivative, and, from the viewpoints of physical properties and curability of the ink composition and flexibility of a cured film, more preferably a carboxy group, a sulfonic group or a phosphoric group, and still more preferably a carboxy group.

The acidic group-containing monofunctional (meth)acrylic acid derivative is preferably (meth)acrylic acid or a monofunctional (meth)acrylic acid ester or amide having at least one carboxy group in the molecule thereof (hereinafter, referred to as a "carboxy group-containing polymerizable compound" in some cases). The carboxy group-containing polymerizable compound is (meth)acrylic acid, or a compound having one (meth)acrylic acid ester or amide and one or more carboxy groups in the molecule thereof. The carboxy group-containing polymerizable compound preferably has 1 to 3 carboxy groups, more preferably 1 or 2 carboxy groups, and still more preferably one carboxy group.

Typical examples of the acidic group-containing monofunctional (meth)acrylic acid derivative include acrylic acid, methacrylic acid and a compound represented by the following Formula (I)

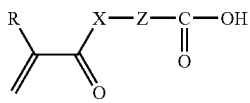

In Formula (I), R represents a hydrogen atom or a methyl group, and, from the viewpoints of reactivity of the compound of Formula (I) and flexibility of a polymer formed by polymerizing the compound(s) of Formula (I) and, if any, other compound(s), is preferably a hydrogen atom. X represents an oxygen atom or NR', and, from the viewpoint of improving mobility around the polymerizable moiety, is preferably an oxygen atom. R' represents a hydrogen atom or an alkyl group, and is preferably a hydrogen atom or an alkyl group having 1 to 4 carbon atoms, and more preferably a hydrogen atom. Z represents a divalent organic group. Typical examples of the divalent organic group include the following:

<Typical Examples of Z>

\*—$(CH_2)_n$—\* [wherein n represents an integer of 2 to 12]

\*—$CH_2$—$CH_2$—O—CO—Z'—\* [wherein Z' represents a divalent organic group selected from the following]

\*—$C_6H_4$—\*

\*—$C_6H_4$—$(CH_2)_n$—\* [wherein n represents an integer of 1 to 12]

\*—$(CH_2)_n$—$C_6H_4$—\* [wherein n represents an integer of 1 to 12]

\*—$(CH_2)_n$—O—$C_6H_4$—\* [wherein n represents an integer of 1 to 12]

<Z'>

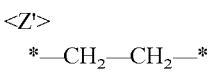

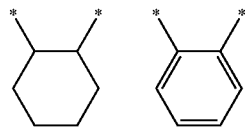

In the above chemical formulae, the mark "\*" represents a linking site.

In the first and second aspects of the invention, the first to fifth moieties of the six moieties described above are preferred.

The acidic group-containing monofunctional (meth)acrylic acid derivative is preferably a compound represented by Formula (I) from the viewpoint of handling properties such as odor.

Specific examples [exemplary compounds (A-1) to (A-15)] of the monofunctional (meth)acrylic acid esters and amides each having at least one carboxy group in the molecule thereof, which can be suitably used in the invention, are shown below, but the invention is not limited by these.

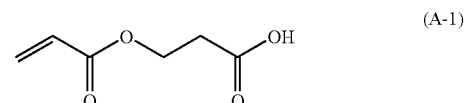
(A-1)

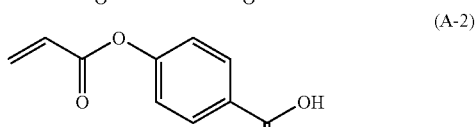
(A-2)

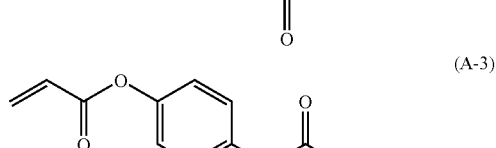
(A-3)

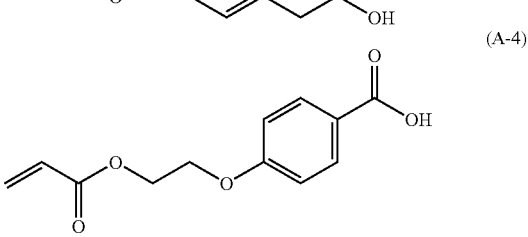
(A-4)

(A-5)

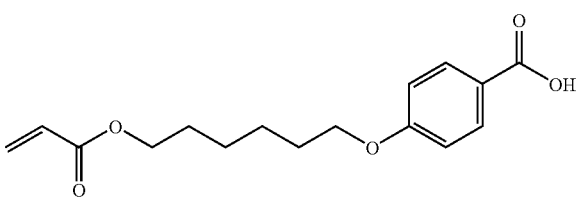

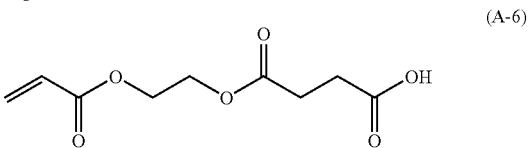
(A-6)

-continued

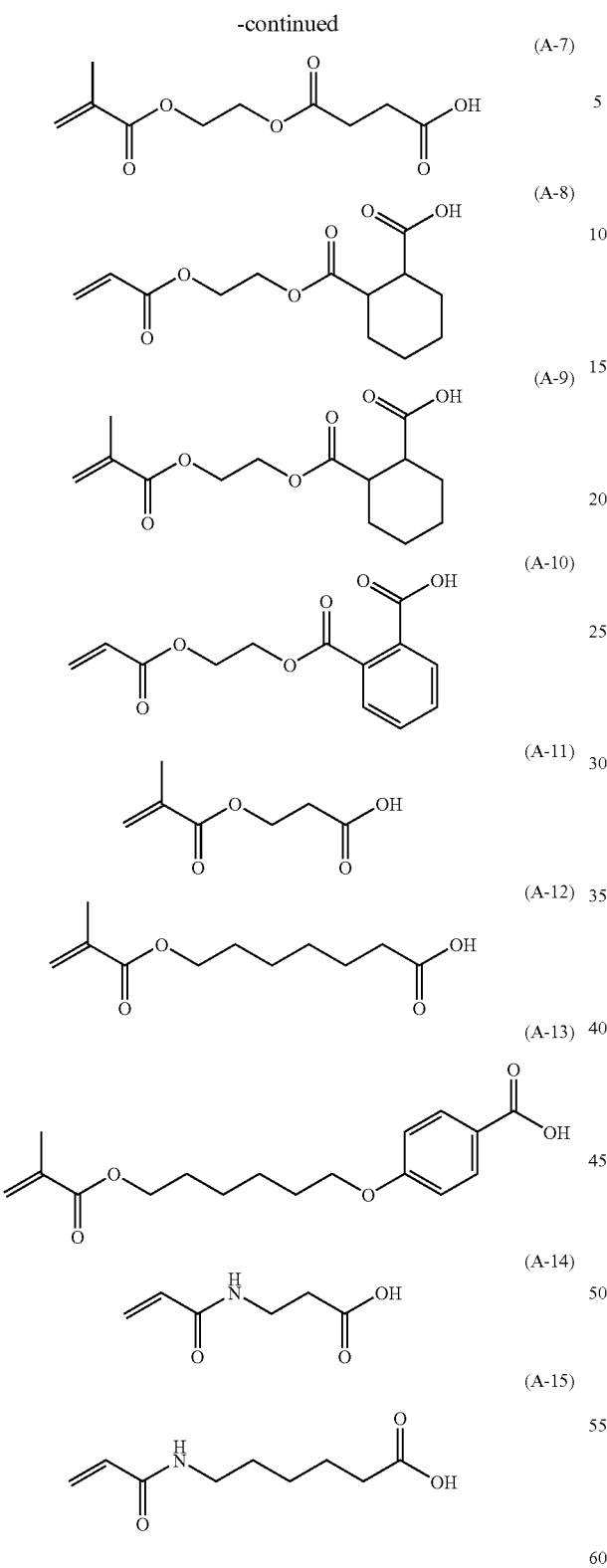

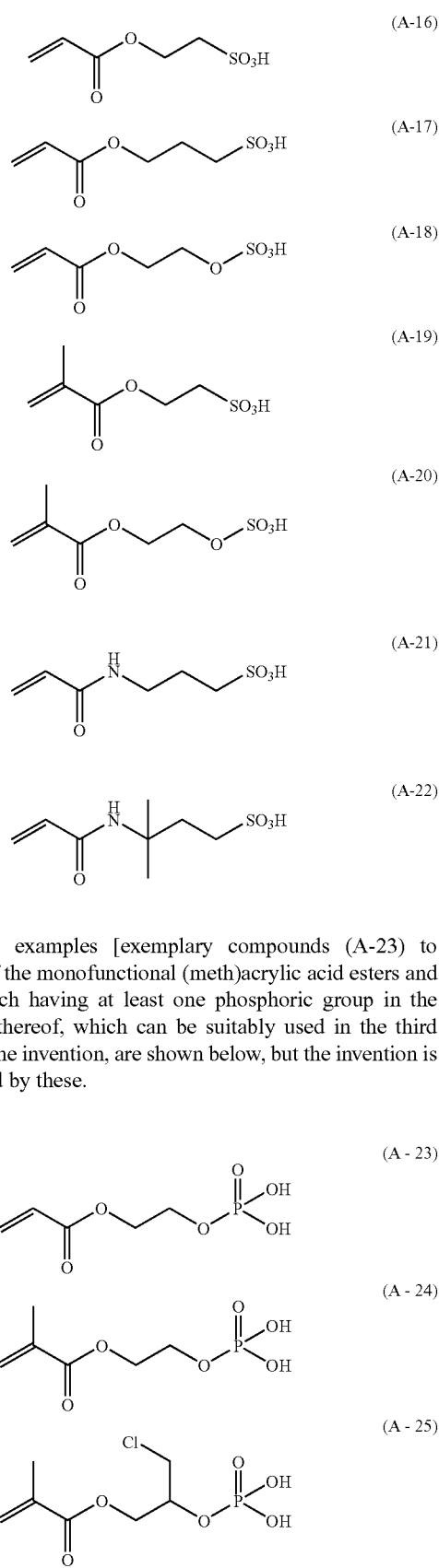

Specific examples [exemplary compounds (A-16) to (A-22)] of the monofunctional (meth)acrylic acid esters and amides each having at least one sulfonic group in the molecule thereof, which can be suitably used in the third aspect of the invention, are shown below, but the invention is not limited by these.

Specific examples [exemplary compounds (A-23) to (A-26)] of the monofunctional (meth)acrylic acid esters and amides each having at least one phosphoric group in the molecule thereof, which can be suitably used in the third aspect of the invention, are shown below, but the invention is not limited by these.

-continued

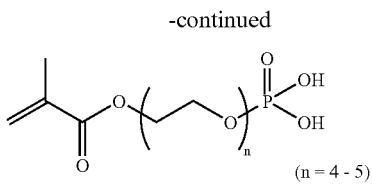

(A - 26)

(n = 4 - 5)

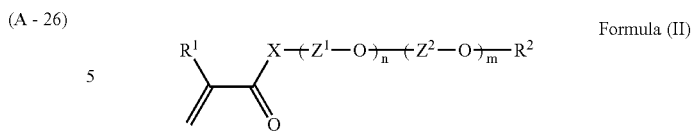

Formula (II)

In the first and the second aspects of the invention, one of those carboxy group-containing polymerizable compounds can be used alone, or two or more of them can be used together. Further, in the third aspect of the invention, one of those acidic group-containing monofunctional (meth)acrylic acid derivatives can be used alone, or two or more of them can be used together.

In the first aspect of the invention, the content of the carboxy group-containing polymerizable compound(s) in the ink composition is preferably 5 to 45% by mass, and more preferably 10 to 35% by mass from the viewpoints of well balance between a curing speed and flexibility, and ink jet suitability of the ink composition.

In the second aspect of the invention, the content of the carboxy group-containing polymerizable compound(s) in the ink composition is preferably 3 to 25% by weight, and more preferably 5 to 20% by mass from the viewpoints of well balance between a curing speed and flexibility, and ink jet suitability of the ink composition.

3) Monofunctional (Meth)acrylic Acid Ester or Amide having Alkylene Oxide Repeating Unit in Molecule Thereof The ink composition according to the second aspect of the invention includes at least one monofunctional (meth)acrylic acid ester or amide having an alkylene oxide repeating unit in the molecule thereof [hereinafter, referred to as an alkylene oxide-containing polymerizable compound in some cases].

Herein, the term "alkylene oxide repeating unit" refers to a unit formed by continuously linking alkylene oxides represented by —R—O— (wherein R is an alkylene group). Here, each of the at least one alkylene moiety of the alkylene oxide repeating unit is preferably a linear or branched alkylene group having 2 to 6 carbon atoms, more preferably an alkylene group having 2 to 4 carbon atoms, and still more preferably an alkylene group having 2 or 3 carbon atoms. R is preferably an ethylene group from the viewpoint of interaction between the carboxyl group-containing polymerizable compound(s) and the alkylene oxide-containing polymerizable compound(s).

Further, two or more alkylene oxide repeating groups having different alkylene structures may be present in the same alkylene oxide chain, and these alkylethe repeating groups may be arranged at random or in a block pattern.

The number of alkylene oxide groups repeated in the alkylene oxide chain (unit) is preferably about 2 to 100, and this number is the average of the alkylene oxide groups contained in all alkylene oxide-containing polymerizable compound molecules used, and the number of alkylene oxide groups repeated may actually have a distribution. The average number of alkylene oxide groups repeated is more preferably 4 or more in order to exhibit interaction between the alkylene oxide-containing polymerizable compound(s) and the carboxy group-containing polymerizable compound(s), but, in order to control an increase in the viscosity of the ink composition, preferably 50 or less, and more preferably 25 or less.

The alkylene oxide-containing polymerizable compound is preferably a compound represented by the following Formula (II).

In Formula (II), $R^1$ represents a hydrogen atom or a methyl group, and, from the viewpoints of reactivity of the compound of Formula (II) and flexibility of a polymer formed by polymerizing the compound(s) of Formula (II) and, if any, other compound(s), is preferably a hydrogen atom. X represents an oxygen atom or NR', and, from the viewpoint of improving mobility around the polymerizable moiety, is preferably an oxygen atom. R' represents a hydrogen atom or an alkyl group, and is preferably a hydrogen atom or an alkyl group having 1 to 4 carbon atoms, and more preferably a hydrogen atom. Each of $Z^1$ and $Z^2$ represents an ethylene group, a (linear or branched) propylene group, or a (linear or branched) butylene group. n represents an integer of 1 to 80, and m represents an integer of 0 to 80. When m is an integer of 1 or more, $Z^1$ and $Z^2$ are not identical. When each of m and n is an integer of 1 or more and the sum of m and n is 3 or more, the repeating moieties of $Z^1$—O and $Z^2$—O may be arranged at random or in a block pattern. It is preferable that $Z^1$ or $Z^2$ is an ethylene group. $R^2$ represents a hydrogen atom, an alkyl group having 1 to 18 carbon atoms, an allyl group or a phenyl group, and the phenyl group may have at least one an alkyl group substituent having 1 to 10 carbon atoms. $R^1$ is preferably an alkyl group having 1 to 18 carbon atoms, more preferably an alkyl group having 1 to 8 carbon atoms, and most preferably a methyl group from the viewpoint of good ink jet suitability of the ink composition.

Specific examples [(B-1) to (B-17)] of the alkylene oxide-containing polymerizable compound, which can be suitably used in the invention, are shown below, but the invention is not limited by these.

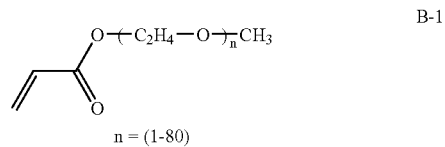

B-1 n = (1-80)

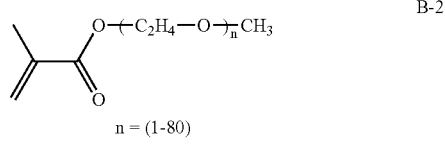

B-2 n = (1-80)

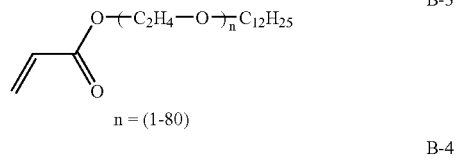

B-3 n = (1-80)

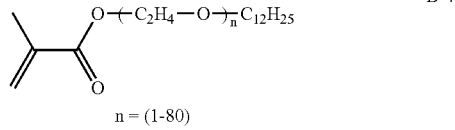

B-4 n = (1-80)

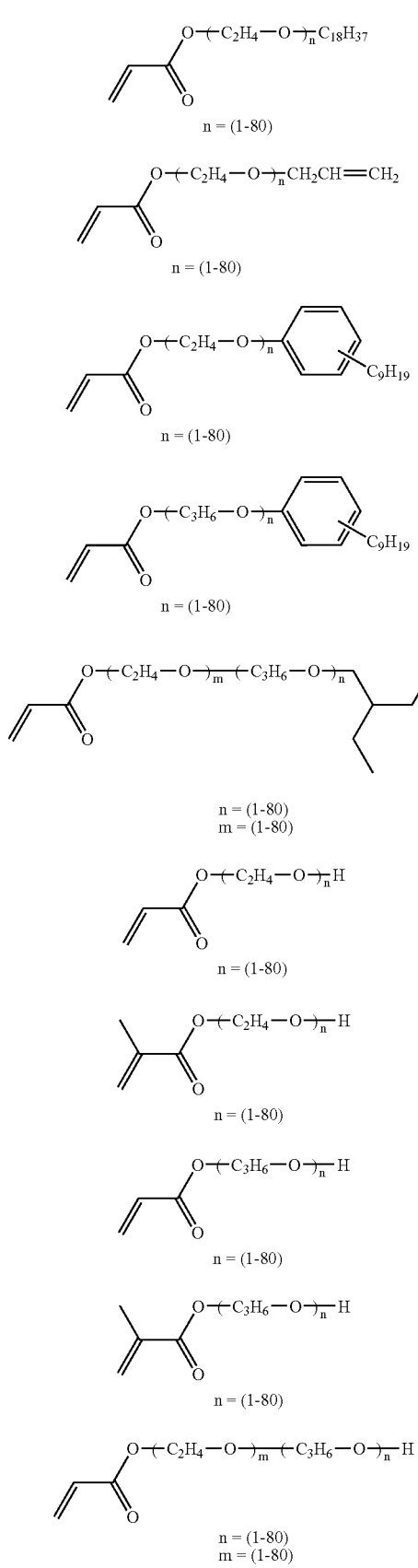
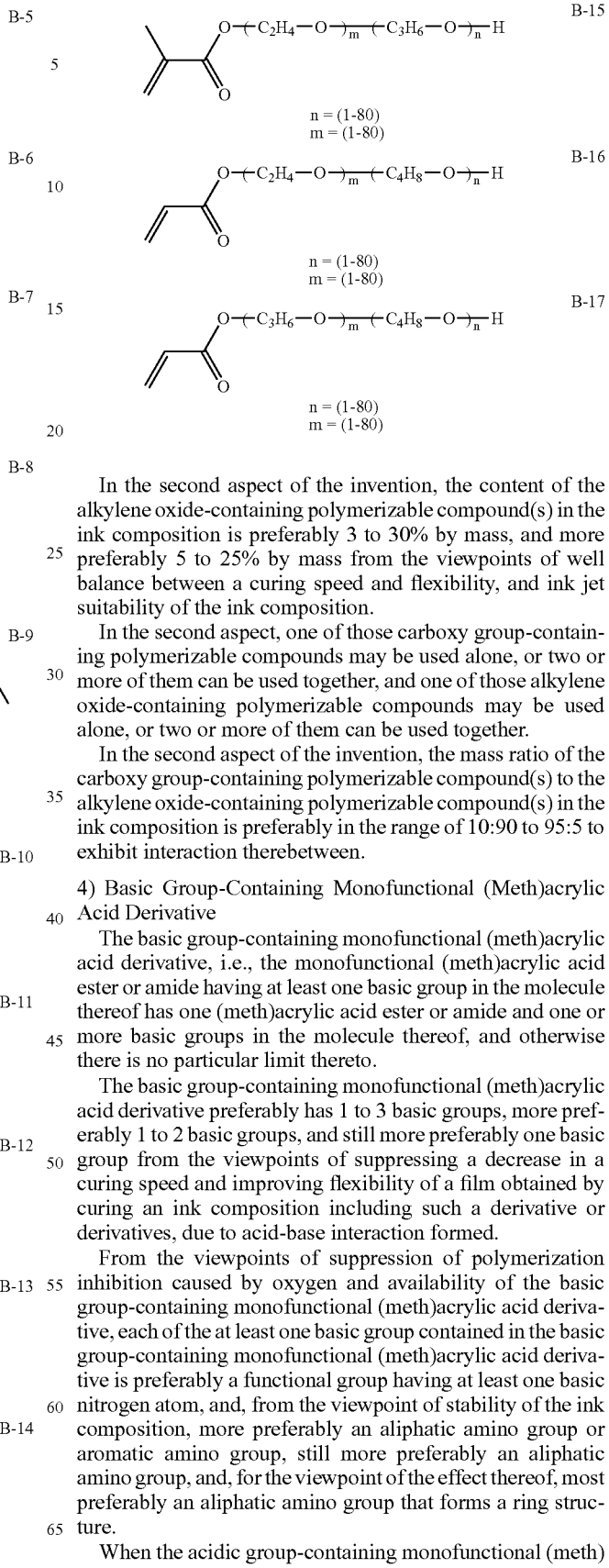

In the second aspect of the invention, the content of the alkylene oxide-containing polymerizable compound(s) in the ink composition is preferably 3 to 30% by mass, and more preferably 5 to 25% by mass from the viewpoints of well balance between a curing speed and flexibility, and ink jet suitability of the ink composition.

In the second aspect, one of those carboxy group-containing polymerizable compounds may be used alone, or two or more of them can be used together, and one of those alkylene oxide-containing polymerizable compounds may be used alone, or two or more of them can be used together.

In the second aspect of the invention, the mass ratio of the carboxy group-containing polymerizable compound(s) to the alkylene oxide-containing polymerizable compound(s) in the ink composition is preferably in the range of 10:90 to 95:5 to exhibit interaction therebetween.

4) Basic Group-Containing Monofunctional (Meth)acrylic Acid Derivative

The basic group-containing monofunctional (meth)acrylic acid derivative, i.e., the monofunctional (meth)acrylic acid ester or amide having at least one basic group in the molecule thereof has one (meth)acrylic acid ester or amide and one or more basic groups in the molecule thereof, and otherwise there is no particular limit thereto.

The basic group-containing monofunctional (meth)acrylic acid derivative preferably has 1 to 3 basic groups, more preferably 1 to 2 basic groups, and still more preferably one basic group from the viewpoints of suppressing a decrease in a curing speed and improving flexibility of a film obtained by curing an ink composition including such a derivative or derivatives, due to acid-base interaction formed.

From the viewpoints of suppression of polymerization inhibition caused by oxygen and availability of the basic group-containing monofunctional (meth)acrylic acid derivative, each of the at least one basic group contained in the basic group-containing monofunctional (meth)acrylic acid derivative is preferably a functional group having at least one basic nitrogen atom, and, from the viewpoint of stability of the ink composition, more preferably an aliphatic amino group or aromatic amino group, still more preferably an aliphatic amino group, and, for the viewpoint of the effect thereof, most preferably an aliphatic amino group that forms a ring structure.

When the acidic group-containing monofunctional (meth)acrylic acid derivative(s) and the basic group-containing monofunctional (meth)acrylic acid derivative(s) are contained in the ink composition, each of the at least one basic group is preferably a functional group that, together with the acidic group having $pK_a$ of less than 11 and a dissociable proton, can form a salt. Therefore, the basic group is preferably a functional group having at least one basic nitrogen atom.

The basic group-containing monofunctional (meth)acrylic acid derivative is preferably a compound represented by the following Formula (III).

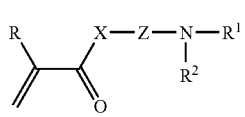

Formula (III)

In Formula (III), R represents a hydrogen atom or a methyl group, and, from the viewpoints of reactivity of the compound of Formula (III) and flexibility of a polymer formed by polymerizing the compound(s) of Formula (III) and, if any, other compound(s), is preferably a hydrogen atom. X represents an oxygen atom or NR', and, from the viewpoint of improving mobility around the polymerizable moiety, is preferably an oxygen atom. R' represents a hydrogen atom or an alkyl group, and is preferably a hydrogen atom or an alkyl group having 1 to 4 carbon atoms, and more preferably a hydrogen atom. Z represents a divalent organic group, and is preferably an alkylene group having 2 to 6 carbon atoms, such as an ethylene group and a propylene group.

Each of $R^1$ and $R^2$ represents an alkyl group having 1 to 4 carbon atoms, and $R^1$ and $R^2$ may be bonded to each other to form a ring structure, which is preferably a 5- or 6-membered ring structure.

Specific examples [exemplary compounds (C-1) to (C-11)] of the monofunctional (meth)acrylic acid esters and amides each having at least one amino group in the molecule thereof, which can be suitably used in the invention, are shown in the following, but the invention is not limited by these.

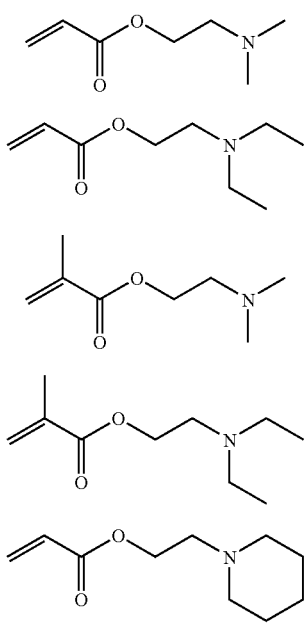

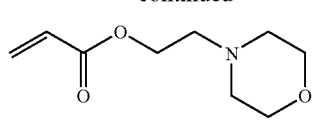

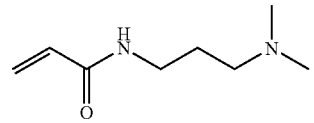

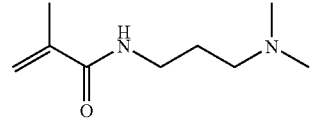

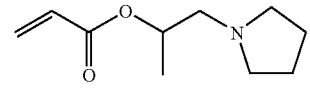

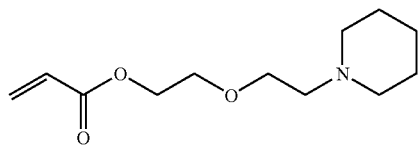

Further, the content of the basic group-containing monofunctional (meth)acrylic acid derivative(s) in the ink composition according to the third aspect of the invention is preferably 3 to 40% by mass, and more preferably 7 to 25% by mass from the viewpoints of well balance between a curing speed and flexibility, and ink jet suitability of the ink composition.

When the ink composition of the third aspect of the invention further includes the acidic group-containing monofunctional (meth)acrylic acid derivative(s) to further improve a curing speed, the content of the acidic group-containing monofunctional (meth)acrylic acid derivative(s) in the ink composition according to the third aspect of the invention is preferably 2 to 35% by mass, and more preferably 5 to 20% by mass from the viewpoints of the viscosity and curing speed of the ink composition, and adhesion and flexibility of a cured film.

In this case, the content of a mixture of the basic group-containing monofunctional (meth)acrylic acid derivative(s) and the acidic group-containing monofunctional (meth) acrylic acid derivative(s) in the ink composition according to the third aspect of the invention is preferably 10 to 50% by mass, and more preferably 12 to 40% by mass from the viewpoints of well balance between a curing speed and flexibility, and ink jet suitability of the ink composition.

Moreover, in the above case, the mixing ratio (molar ratio) of the acidic group-containing monofunctional (meth)acrylic acid derivative(s) to the basic group-containing monofunctional (meth)acrylic acid derivative(s) is preferably 40:60 to 60:40, and more preferably 50:50. When the mixing ratio is out of the range of 40:60 to 60:40, such an ink composition has a remarkably increased viscosity and deteriorated ink jet suitability.

The ink composition of the invention may further contain other component(s) as well as the essential components to, for example, improve the physical properties of the ink composition, unless the component(s) does not adversely affect the advantageous effects of the invention. Additional components that the ink composition may contain will be described below.

5) Other Polymerizable Compound

The ink composition of each of the first to third aspects of the invention preferably contains at least one of other polymerizable compounds in addition to the aforementioned polymerizable component(s).

In the third aspect, a combined use of (meth)acrylic acid derivative having a five- or six-membered ring containing at least one nitrogen atom, which the basic group-containing (meth)acrylic acid derivative is most preferably, with other polymerizable compound that may be polymerized to form a polymer having a high glass transition temperature in the ink composition enables formation of image portions having controlled curing property, stability and strength. This is because a copolymer obtained by polymerizing the above derivative has a comparatively low glass transition temperature (Tg).

Examples of other polymerizable compounds include radical and cationic polymerizable compounds. The type of each of the at least one polymerizable compound is selected properly in consideration of desired properties or compatibility with respect to the polymerization initiator(s) used.

(5-1) Radical Polymerizable Compound

The radical polymerizable compound has at least one radical polymerizable ethylenic unsaturated bond in the molecule thereof. The radical polymerizable compound may be in the form of a monomer, an oligomer, or a polymer. Only one radical polymerizable compound may be used alone. Alternatively, two or more radical polymerizable compounds may be used together at an arbitrary ratio to improve at least one of the properties of the ink composition. Combined use of two or more radical polymerizable compounds is preferable to control reactivity and the physical properties of the ink composition.

The polymerizable compound having at least one radical polymerizable ethylenic unsaturated bond may be unsaturated carboxylic acid such as acrylic acid, methacrylic acid, itaconic acid, crotonic acid, isocrotonic acid or maleic acid or a salt thereof, anhydride having at least one ethylenic unsaturated group, acrylonitrile, styrene, unsaturated polyester, unsaturated polyether, unsaturated polyamide, or unsaturated urethane.

Specific examples thereof include acrylic acid derivatives such as 2-ethylhexyl acrylate, 2-hydroxyethyl acrylate, butoxyethyl acrylate, carbitol acrylate, cyclohexyl acrylate, tetrahydrofurfuryl acrylate, benzyl acrylate, bis(4-acryloxy-polyethoxyphenyl)propane, neopentyl glycol diacrylate, 1,6-hexanediol diacrylate, ethylene glycol diacrylate, diethylene glycol diacrylate, triethylene glycol diacrylate, tetraethylene glycol diacrylate, polyethylene glycol diacrylate, polypropylene glycol diacrylate, pentaerythritol triacrylate, pentaerythritol tetraacrylate, dipentaerythritol tetraacrylate, trimethylolpropane triacrylate, tetramethylolmethane tetraacrylate, oligoester acrylates, N-methylol acrylamide, diacetone acrylamide, and epoxy acrylates; methacrylic acid derivatives such as methyl methacrylate, n-butyl methacrylate, 2-ethylhexyl methacrylate, lauryl methacrylate, allyl methacrylate, glycidyl methacrylate, benzyl methacrylate, dimethylaminomethyl methacrylate, 1,6-hexanediol dimethacrylate, ethylene glycol dimethacrylate, triethylene glycol dimethacrylate, polyethylene glycol dimethacrylate, polypropylene glycol dimethacrylate, trimethylolethane trimethacrylate, trimethyrolpropane trimethacrylate, and 2,2-bis(4-methacryloxypolyethoxyphenyl)propane; and derivatives of allyl compounds such as allyl glycidyl ether, diallyl phthalate, and triallyl trimellitate. More specifically, radical polymerizable or cross-linkable monomers, oligomers and polymers commercially available or known in the art, including those described in *Cross-linking Agent Handbook* edited by Shinzo Yamashita and published by Taisei Publisher in 1981, *UV or EB Curing Handbook* (*Raw Material Book*) edited by Kiyoshi Kato and published by Kobunshi Kankokai in 1985, *Application and Market of UV or EB Curing Technology* (p. 79) edited by RadTech Japan published by CMC publisher in 1989, and *Polyester Resin Handbook* written by Eiichiro Takiyama and published by Nikkankogyo Shimbun in 1988, the disclosures of which are incorporated herein by reference, can also be used as such.

Furthermore, photocurable polymerizable compounds used in photopolymerizable compositions described in, for example, JP-A No. H07-159983, Japanese Patent Application Publication (JP-B) No. H07-31399, JP-A Nos. H08-224982, H10-863, and H09-134011 are known as the radical polymerizable compounds, and at least one of them can also be used in the ink composition of the invention.

(5-2) Cationic Polymerizable Compound

The ink composition of the invention may further contain at least one cationic polymerizable compound, as needed.

The cationic polymerizable compound for use in the invention is required to initiate polymerization reaction in the presence of the acid generated by a agent that optically generates acid and to cure, and otherwise there is no particular limit thereto. The cationic polymerizable compound can be any of cationic polymerizable monomers known as photo-cationic polymerizable monomers. Examples of the cation polymerizable monomers include epoxy, vinyl ether, and oxetane compounds described in JP-A Nos. H06-9714, 2001-31892, 2001-40068, 2001-55507, 2001-310938, 2001-310937, and 2001-220526.

For example, polymerizable compounds contained in a cationic polymerizable, photocurable resin are also known as the cationic polymerizable compounds. In recent years, polymerizable compounds contained in photocationic polymerizable, photocurable resins sensitized to visible light within the wavelength region of 400 nm or more are disclosed in JP-A Nos. H06-43633 and H08-324137. These can also be used in the ink composition of the invention.

The ink composition of the invention may contain only one of those cationic polymerizable compounds, or two or more of them. However, the ink composition of the invention preferably contains at least one compound selected from oxetane and epoxy compounds, and at least one vinyl ether compound so as to effectively suppress shrinkage of the ink composition during curing of the ink composition.

(C-3) Preferred Other Polymerizable Compound

Each of other polymerizable compound(s) usable in the invention is preferably (meth)acrylic ester of a (meth)acrylic monomer or prepolymer, an epoxy monomer or prepolymer, or an urethane monomer or prepolymer (hereinafter, referred to as an "acrylate compound" in some cases). Each of Other polymerizable compound(s) is more preferably one of the following compounds.

That is, 2-ethylhexyl-diglycol acrylate, 2-hydroxy-3-phenoxypropyl acrylate, 2-hydroxybutyl acrylate, hydroxypivalic acid neopentylglycol diacrylate, 2-acryloyloxyethylphthalic acid, methoxy-polyethylene glycol acrylate, tetramethylolmethane triacrylate, 2-acryloyloxyethyl-2-hydroxyethylphthalic acid, dimethyloltricyclodecane diacrylate, ethoxylated phenyl acrylate, 2-acryloyloxyethylsuccinic acid, nonylphenol EO adduct acrylate, modified glycerine triacrylate, bisphenol A diglycidyl ether acrylic acid adduct, modified bisphenol A diacrylate, phenoxy-polyethylene glycol acrylate, 2-acryloyloxyethyl hexahydrophthalic acid, bisphenol A PO adduct diacrylate, bisphenol A EO adduct diacrylate, dipentaerythritol hexaacrylate, pentaerythritol triacrylate tolylene diisocyanate urethane prepolymer, lactone-modified flexible acrylate, butoxyethyl acrylate, propylene glycol diglycidyl ether acrylic acid adduct, pentaerythritol triacrylate hexamethylene diisocyanate urethane prepolymer, 2-hydroxyethyl acrylate, methoxydipropylene glycol acrylate, ditrimethylolpropane tetraacrylate, pentaerythritol triacrylate hexamethylene diisocyanate urethane prepolymer, stearyl acrylate, isoamyl acrylate, isomyristyl acrylate, isostearyl acrylate, and lectone-modified acrylate can be used as such.

These acrylate compounds have less skin irritation and less sensitizing property (less causing rash) than polymerizable compounds used in conventional UV-curable inks. Further, the viscosity of each of the acrylate compounds can be relatively low, and the acrylate compounds allow ink to be stably discharged, and have high polymerization sensitivity, and strong adhesiveness to recording media.

The monomers described as other polymerizable compounds have a low sensitizing property, high reactivity, a low viscosity, and strong adhesiveness to recording media, regardless of their having low molecular weight.

To further improve sensitivity, ink bleeding resistance, and adhesiveness to recording media, it is preferable to use at least one of multifunctional acrylate monomers and oligomers having molecular weight of 400 or more, preferably 500 or more, together with at least one of the aforementioned monoacrylates. In particular, it is preferable that an ink composition used to record images on a soft recording medium such as a PET or PP film contains not only at least one monoacrylate selected from the aforementioned compounds but also at least one of multifunctional acrylate monomers and oligomers, so as to obtain a film having flexibility, strong adhesiveness and strength.

It is particularly preferable to use at least one monofunctional monomer, at least one bifunctional monomer, and at least one tri- or higher-functional monomer together as polymerizable compounds so as to further improve sensitivity, ink bleeding resistance, and adhesiveness to recording media and to keep safety.

The monoacrylate is preferably stearyl acrylate, isoamyl acrylate, isomyristyl acrylate, or isostearyl acrylate, because they have high sensitivity and low contractility, and can prevent curling and ink bleeding, and can reduce odor of printed matters and cost of an irradiation apparatus.

Epoxy or urethane acrylate oligomer is particularly preferably used as the oligomer used in combination with the monoacrylate.

Methacrylates have less skin irritation than acrylates.

Among the above compounds, it is preferable to use a mixture containing alkoxy acrylate in a content of less than 70% by mass and acrylate in the rest portion, to obtain an ink composition having good sensitivity, bleeding resistance, and odor properties.

When the ink composition according to each of the first and third aspects of the invention contains at least one other polymerizable compound including the acrylate compound(s), the content of the acrylate compound(s) in such other polymerizable compound(s) is preferably 10% by mass or more, more preferably 15% by mass or more, and even more preferably 20% by mass or more. Further, other polymerizable compound(s) may include only the acrylate compound(s).

When the ink composition according to the second aspect of the invention contains at least one other polymerizable compound including the acrylate compound(s), the content of the acrylate compound(s) in such other polymerizable compound(s) is preferably 30% by mass or more, more preferably 40% by mass or more, and even more preferably 50% by mass or more. Further, other polymerizable compound(s) may include only the acrylate compound(s).

<Amount of Polymerizable Compound Added>

The content of the polymerizable compound(s) in the ink composition according to each of the first and third aspects of the invention, i.e., the total content of the carboxy group-containing polymerizable compound(s) or acidic group-containing monofunctional (meth)acrylic acid derivative(s), and, if any, other polymerizable compound(s) usable together therewith is 5 to 97% by mass, and more preferably 30 to 95% by mass.

The content of the polymerizable compound(s) in the ink composition according to the second aspect of the invention, i.e., the total content of the carboxy group-containing polymerizable compound(s), and, if any, other polymerizable compound(s) usable together therewith is 6 to 55% by mass, and more preferably 10 to 45% by mass.

Further, the content of the carboxy group-containing polymerizable compound(s) in the polymerizable compound(s) (i.e., the carboxy group-containing polymerizable compound(s) and other polymerizable compound(s)) contained in the ink composition of the invention is preferably 10% by mass or more, more preferably 15% by mass or more, even more preferably 20% by mass or more, and most preferably 30% by mass or more.

When the ink composition includes at least one colorant, the types of the polymerization initiator(s) and the polymerizable compound(s) may be so selected as to prevent the light-shielding effect of the colorant(s) from degrading sensitivity of the ink composition. For example, the ink composition may contain a combination of at least one cationic polymerizable compound and at least one cationic polymerization initiator, a combination of at least one radical polymerizable compound and at least one radical polymerization initiator, or may be a radical-cationic hybrid curable ink containing the both combinations.

(D) Colorant

When the ink composition of the invention is used to form image regions of planographic printing plates, the image regions are not needed to be colored, in general. However, when the image regions are required to have improved visibility or when the ink composition of the invention is used to form a colored image, the ink composition may contain at least one colorant (D).

There is no particular limit to the colorant(s) that can be used in the invention. However, each of the at least one colorant is preferably a pigment (6-1) or an oil-soluble dye (6-2), which has good weather resistance and color reproducibility, and may be any one of those known as such, including soluble dyes. A compound not functioning as a polymerization inhibitor in polymerization reaction, which is curing reaction, is preferably selected as each of the at least one colorant usable in the ink composition or the ink composition for ink jet recording of the invention in order to prevent a decrease in sensitivity of curing reaction caused by active radiation rays.

6-1 Pigment

There is no particular limit to the pigment for use in the invention. Examples thereof include organic and inorganic pigments described in Color Index and having the following numbers.

As for red and magenta pigments, the pigment may be Pigment Red 3, 5, 19, 22, 31, 38, 43, 48:1, 48:2, 48:3, 48:4, 48:5, 49:1, 53:1, 57:1, 57:2, 58:4, 63:1, 81, 81:1, 81:2, 81:3, 81:4, 88, 104, 108, 112, 122, 123, 144, 146, 149, 166, 168, 169, 170, 177, 178, 179, 184, 185, 208, 216, 226, or 257, Pigment Violet 3, 19, 23, 29, 30, 37, 50, or 88, or Pigment Orange 13, 16, 20, or 36.

As for blue and cyan pigments, the pigment may be Pigment Blue 1, 15, 15:1, 15:2, 15:3, 15:4, 15:6, 16, 17-1, 22, 27, 28, 29, 36, or 60.

As for green pigments, the pigment may be Pigment Green 7, 26, 36, or 50.

As for yellow pigments, the pigment may be Pigment Yellow 1, 3, 12, 13, 14, 17, 34, 35, 37, 55, 74, 81, 83, 93, 94, 95, 97, 108, 109, 110, 137, 138, 139, 153, 154, 155, 157, 166, 167, 168, 180, 185, or 193.

As for black pigments, the pigment may be Pigment Black 7, 28, or 26.

As for white pigments, the pigment may be Pigment White 6, 18, or 21.

One or more of these pigments can be used according to the application of the ink composition.

6-2 Oil-Soluble Dye

Hereinafter, the oil-soluble dye usable in the invention will be described.

The oil-soluble dye usable in the invention is substantially insoluble in water.

Specifically, the solubility of the oil-soluble dye in water kept at 25° C. (the weight of the dye soluble in 100 g of water) is 1 g or less, preferably 0.5 g or less, and more preferably 0.1 g or less. Thus, examples of the oil-soluble dye include so-called water-insoluble pigments and oil-soluble colorants. Among them, the oil-soluble dye is preferably an oil-soluble colorant.

When the oil-soluble dye usable in the invention is a yellow dye, the yellow dye may be any one of those known as such. Examples thereof include aryl- and heteryl-azo dyes each having as the coupling moiety a phenol, naphthol, aniline, pyrazolone, pyridone, or open-chain active methylene moiety; azomethine dyes having as the coupling moiety an open-chain active methylene moiety; methine dyes such as benzylidene dyes and monomethine oxonol dyes; quinone dyes such as naphthoquinone dyes and anthraquinone dyes; quinophtharone dyes; nitro and nitroso dyes; acridine dyes; and acridinone dyes.

When the oil-soluble dye usable in the invention is a magenta dye, the magenta dye may be any one of those known as such. Examples thereof include aryl- and heteryl-azo dyes each having as the coupling moiety a phenol, naphthol, or aniline moiety; azomethine dyes having as the coupling moiety a pyrazolone or pyrazolotriazole moiety; methine dyes such as arylidene dyes, styryl dyes, merocyanine dyes, and oxonol dyes; carbonium dyes such as diphenylmethane dyes, triphenylmethane dyes, and xanthene dyes; quinone dyes such as naphthoquinones, anthraquinones, and anthrapyridones; and fused polycyclic dyes such as dioxazine dyes.

When the oil-soluble dye usable in the invention is a cyan dye, the cyan dye may be any one of those known as such. Examples thereof include azoriethine dyes such as indoaniline dyes, indophenol dyes, and dyes having a pyrrolotriazole moiety as the coupling moiety; polymethine dyes such as cyanine dyes, oxonol dyes, and merocyanine dyes; carbonium dyes such as diphenylmethane dyes, triphenylmethane dyes, and xanthene dyes; phthalocyanine dyes; anthraquinone dyes; aryl- and heteryl-azo dyes each having as the coupling moiety a phenol, naphthol, or aniline moiety; and indigo and thioindigo dyes.

The dye may be a compound having chromophore (color-forming atomic group) that dissociates to form a color such as yellow, magenta, or cyan. In this case, the dye has a counter cation, which may be an inorganic cation such as an alkali metal or an ammonium group, or an organic cation such as a pyridinium group or a quaternary ammonium salt, or a polymeric cation having, as the partial structure, a cation selected from those described above.

Typical examples thereof include, but are not limited to, C.I. Solvent Black 3, 7, 27, 29 and 34; C.I. Solvent Yellow 14, 16, 19, 29, 30, 56, 82, 93 and 162; C.I. Solvent Red 1, 3, 8, 18, 24, 27, 43, 49, 51, 72, 73, 109, 122, 132 and 218; C.I. Solvent Violet 3; C.I. Solvent Blue 2, 11, 25, 35, 38, 67 and 70; C.I. Solvent Green 3 and 7; and C.I. Solvent Orange 2.

Examples of products serving as such colorants include NUBIAN BLACK PC-0850, OIL BLACK HBB, OIL YELLOW 129, OIL YELLOW 105, OIL PINK 312, OIL RED 5B, OIL SCARLET 308, VALI FAST BLUE 2606, and OIL BLUE BOS (manufactured by Orient Chemical Industries); AIZEN SPILON BLUE GNH (manufactured by Hodogaya Chemical Co., Ltd.); and NEOPEN YELLOW 075, NEOPEN MAZENTA SE1378, NEOPEN BLUE 808, NEOPEN BLUE FF4012, and NEOPEN CYAN FF4238 (manufactured by BASF).

In the invention, one of these oil-soluble dyes may be used alone, or two or more of them can be used together.

When the ink composition of the invention includes an oil-soluble dye as the colorant, the ink composition may further contain other colorant(s) such as a water-soluble dye, a disperse dye, or a pigment in an amount that does not adversely affect the advantageous effects of the invention.

The ink composition of the invention may contain at least one disperse dye in such an amount that the at least one disperse dye can be dissolved in a water-immiscible organic solvent or solvents. Examples of the disperse dye generally include water-soluble dyes. However, the disperse dye is preferably used in such an amount that it can be dissolved in the water-immiscible organic solvent in the invention, as described above. Typical examples thereof include C.I. Disperse Yellow 5, 42, 54, 64, 79, 82, 83, 93, 99, 100, 119, 122, 124, 126, 160, 184:1, 186, 198, 199, 201, 204, 224 and 237; C.I. Disperse Orange 13, 29, 31:1, 33, 49, 54, 55, 66, 73, 118, 119 and 163; C.I. Disperse Red 54, 60, 72, 73, 86, 88, 91, 92, 93, 111, 126, 127, 134, 135, 143, 145, 152, 153, 154, 159, 164, 167:1, 177, 181, 204, 206, 207, 221, 239, 240, 258, 277, 278, 283, 311, 323, 343, 348, 356 and 362; C.I. Disperse Violet 33; C.I. Disperse Blue 56, 60, 73, 87, 113, 128, 143, 148, 154, 158, 165, 165:1, 165:2, 176, 183, 185, 197, 198, 201, 214, 224, 225, 257, 266, 267, 287, 354, 358, 365 and 368; and C.I. Disperse Green 6:1 and 9.

Preferably, the colorant for use in the invention is added to other components of the ink composition or the ink composition for ink jet recording of the invention, and moderately dispersed therein. Any of various dispersing machines, such as a ball mill, a sand mill, an attritor, a roll mill, an agitator, HENSCHEL mixer, a colloid mill, an ultrasonic wave homogenizer, a pearl mill, a wet-type jet mill, or a paint shaker, may be used to disperse the colorant.

In addition, the ink composition of the invention may further contain at least one dispersant to disperse the colorant therein. There is no particular limit to the type of each of the at least one dispersant. However, the dispersant is preferably a polymeric dispersant. The polymer dispersant is, for example, one of Solsperse series manufactured by Zeneca company. When the ink composition of the invention contains a pigment, the ink composition may further contain, as a dispersion aid, at least one synergist suitable for the type of the pigment. In the invention, the total amount of the dispersant(s) and the dispersion aid(s) is preferably 1 to 50 parts by weight with respect to 100 parts of the colorant(s).

In preparing the ink composition of the invention, the colorant may be added to the other components of the ink composition as it is. Alternatively, to improve the dispersion state of the colorant, the colorant may be added to a solvent or a dispersion medium or media such as the carboxy group-containing polymerizable compound(s) or the specific monofunctional (meth)acrylic acid derivative(s), and other polymerizable compound(s), which is added as needed, and uniformly dispersed or dissolved therein, and the resultant may be then added to the other components.

In the invention, the colorant is preferably added to and mixed with one of at least one polymerizable compound including the carboxy group-containing polymerizable compound(s) or the specific monofunctional (meth)acrylic acid derivative(s), or a mixture of the carboxy group-containing polymerizable compound(s) or the specific monofunctional (meth)acrylic acid derivative(s) and at least one other polymerizable compound to avoid use of a solvent, which may remain in a cured image and degrade the solvent resistance of the image, and problems regarding volatile organic compounds (VOC). When only dispersion suitability is considered, the polymerizable compound(s) used in the addition of the colorant(s) is preferably a monomer having the lowest viscosity.

One or more of those colorants may be used according to the application of the ink composition.

When the ink composition includes a colorant that remains as solid therein, such as a pigment, it is preferable that the types of the colorant, a dispersant, and a dispersion medium, and dispersion and filtration conditions are so properly selected as to control the average diameter of the colorant particles within the range of 0.005 to 0.5 μm. The average diameter is more preferably 0.01 to 0.45 μm, and still more preferably 0.015 to 0.4 μm. Controlling the average diameter of the colorant particles can suppress clogging of a nozzle head and allows preservation of the storage stability, transparency and curing sensitivity of the ink.

A desired content for the colorant(s) in the ink composition of the invention may be determined properly according to the application of the ink composition. However, the content of the colorant(s) in the ink composition is preferably 1 to 10% by mass, and more preferably 2 to 8% by mass, considering the physical properties and the color-forming property of the ink composition.

7) Sensitizing Dye

The ink composition of the invention may contain at least one sensitizing dye to accelerate decomposition of the polymerization initiator(s) caused by irradiation of active rays. The sensitizing dye absorbs particular active radiation rays and is then electronically excited. When the electronically excited sensitizing dye comes into contact with a polymerization initiator, electron transfer, energy transfer, and heat generation occur. As a result, the polymerization initiator chemically changes, that is, decomposes, and generates radicals, acid or base.

The type of the sensitizing dye can be determined in consideration of the wavelength of active radiation rays used to cause the polymerization initiator contained in the ink composition to generate initiation species. Considering the sensitizing dye being used for curing reaction of an ordinary ink composition, the sensitizing dye is preferably one of the following compounds that have an absorption wavelength in the range of 350 to 450 nm.

The sensitizing dye is preferably one of polynuclear aromatic compounds (such as pyrene, perylene, and triphenylene), xanthenes (such as fluorescein, eosin, erythrocin, rhodamine B, and rose bengal), cyanines (such as thiacarbocyanine and oxacarbocyanine), merocyanines (such as merocyanine and carbomerocyanine), thiazines (such as thionine, methylene blue, and toluidine blue), acridines (such as acridine orange, chloroflavine, and acriflavine), anthraquinones (such as anthraquinone), and squaliums (such as squalium), and coumarins (such as 7-diethylamino-4-methylcoumarin).

The sensitizing dye is more preferably one of compounds represented by the following Formulae (IV) to (VIII).

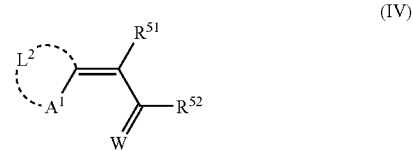

In Formula (IV), $A^1$ represents a sulfur atom or $NR^{50}$; $R^{50}$ represents an alkyl group or an aryl group; $L^2$, together with the neighboring $A^1$ and carbon atom, represents a non-metal atomic group that forms the basic nucleus of a dye; $R^{51}$ and $R^{52}$ independently represent a hydrogen atom or a monovalent non-metal atomic group; and $R^{51}$ and $R^{52}$ may bind to each other to form the acidic nucleus of the dye. W represents an oxygen or sulfur atom.

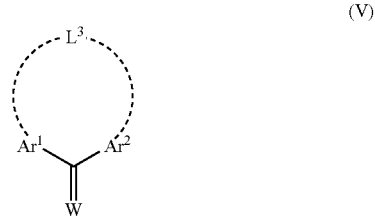

In Formula (X), $Ar^1$ and $Ar^2$ respectively represent aryl groups that are bound to each other via an -$L^3$- bond; and $L^3$ represents —O— or —S—. W has the same meaning as in Formula (IV).

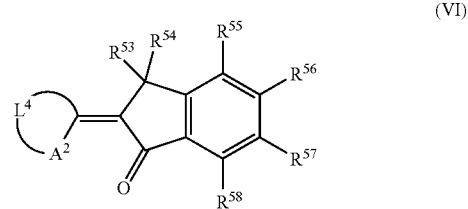

In Formula (VI), $A^2$ represents a sulfur atom or $NR^{59}$; $L^4$, together with the neighboring $A^2$ and carbon atom, represents a non-metal atomic group that forms the basic nucleus of a dye; $R^{53}$, $R^{54}$, $R^{55}$, $R^{56}$, $R^{57}$ and $R^{58}$ independently represent a monovalent non-metal atomic group; and $R^{59}$ represents an alkyl or aryl group.

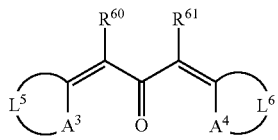

(VII)

In Formula (VII), $A^3$ and $A^4$ independently represent —S—, —$NR^{62}$—, or —$NR^{63}$—; $R^{62}$ and $R^{63}$ independently represent a substituted or unsubstituted alkyl group or a substituted or unsubstituted aryl group; $L^5$ and $L^6$, together with the corresponding one of the neighboring $A^3$ and $A^4$, and the neighboring carbon atom, independently represent a nonmetal atomic group that forms the basic nucleus of a dye; and $R^{60}$ and $R^{61}$ independently represent a hydrogen atom or a monovalent non-metal atomic group, or may bind to each other to form an aliphatic or aromatic ring.

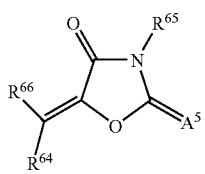

(VIII)

In Formula (VIII), $R^{66}$ represents an aromatic or hetero ring that may have at least one substituent; A represents an oxygen or sulfur atom, or —$NR^{67}$—. $R^{64}$, $R^{65}$ and $R^{67}$ independently represent a hydrogen atom or a monovalent non-metal atomic group; and $R^{67}$ and $R^{64}$, and $R^{65}$ and $R^{67}$ may bind to each other to form an aliphatic or aromatic ring.

Typical examples of the compounds represented by Formulae (IV) to (VIII) include the compounds below.

(E-1)

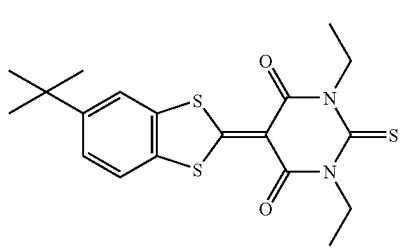

(E-2)

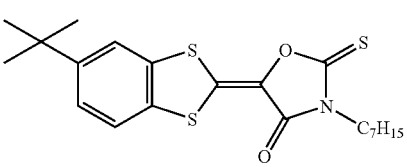

(E-3)

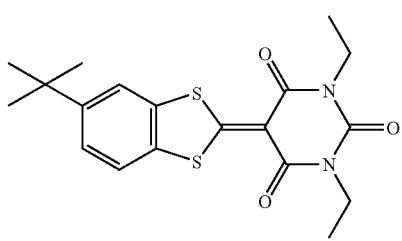

(E-4)

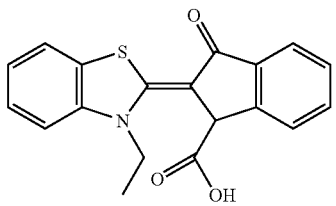

(E-5)

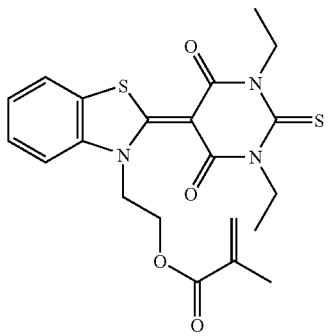

(E-6)

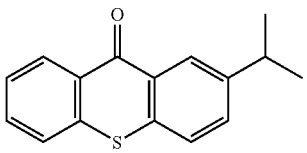

(E-7)

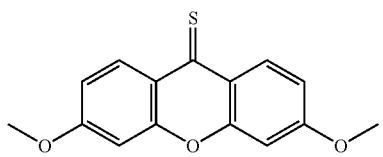

(E-8)

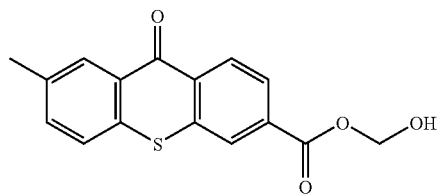

(E-9)

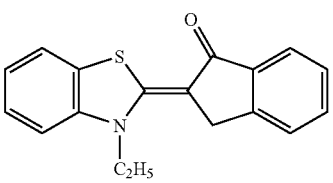

(E-10)

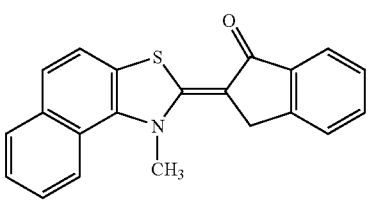

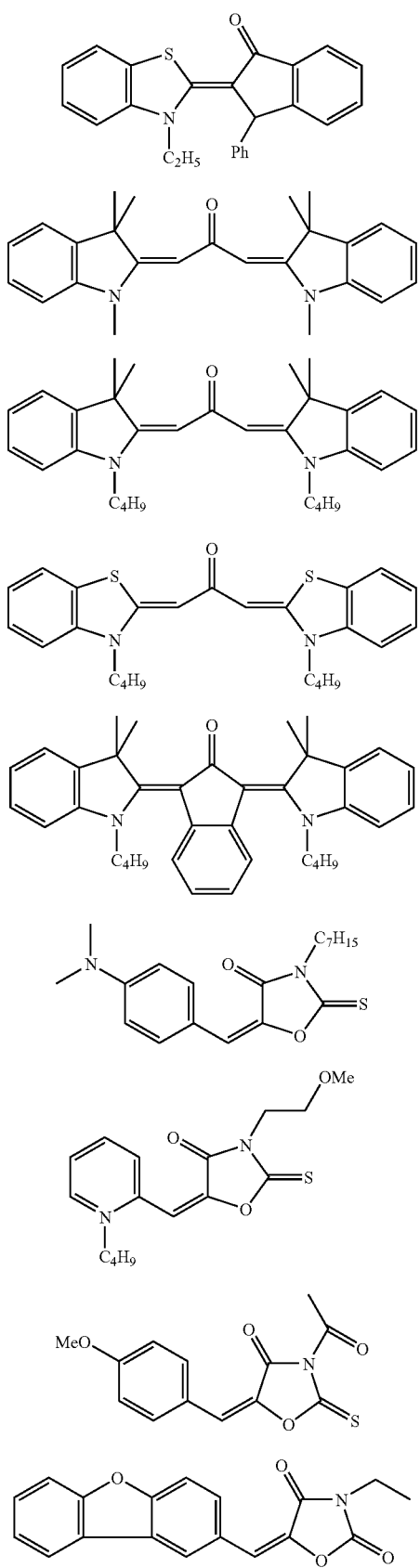
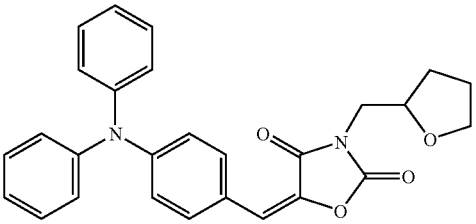

8) Co-Sensitizer

The ink composition of the invention may contain at least one co-sensitizer. The co-sensitizer has function of improving the sensitivity of the sensitizing dye to active radiation rays, or preventing oxygen from inhibiting polymerization of the polymerizable compound(s).

The co-sensitizer can be amine, for example, one of those described in *Journal of Polymer Society* written by M. R, Sander et al., vol. 10, p. 3173, (1972), JP-B No. S44-20189, JP-A Nos. S51-82102, S52-134692, S59-138205, S60-84305, S62-18537, and S64-33104 and Research Disclosure 33825. Specific examples thereof include triethanolamine, ethyl p-dimethylaminobenzoate, p-formyldimethylaniline, and p-methylthiodimethylaniline.

The co-sensitizer can also be thiol or sulfide, for example, one of thiol compounds described in JP-A No. S53-702, JP-B No. S55-500806, and JP-A No. H05-142772, and disulfide compounds described in JP-A No. S56-75643. Specific examples thereof include 2-mercaptobenzothiazole, 2-mercaptobenzoxazole, 2-mercaptobenzimidazole, 2-mercapto-4(3H)-quinazoline, and β-mercaptonaphthalene.

The co-sensitizer can also be one of amino acid compounds (e.g., N-phenylglycine), organic metal compounds described in JP-B No. S48-42965 (e.g., tributyltin acetate), hydrogen-donating compounds described in JP-B No. S55-34414, sulfur compounds described in JP-A No. H06-308727 (e.g., trithiane), phosphorus compounds described in JP-A No. H06-250387 (e.g., diethyl phosphite), and Si—H and Ge—H compounds described in JP-A No. H08-65779.

9) Other Components

The ink composition of the invention may further contain other component(s), if necessary. Examples of other components include at least one polymerization inhibitor, and at least one solvent.

The polymerization inhibitor may be contained to improve the storability of the ink composition. When the ink composition of the invention is used in ink jet recording, the ink composition is preferably heated at a temperature in the range of 40 to 80° C. to lower the viscosity thereof and then discharged. In such a case, the ink composition preferably contains at least one polymerization inhibitor to prevent head clogging due to thermal polymerization. The amount of the polymerization inhibitor(s) is preferably 200 to 20,000 ppm with respect to the total amount of the ink composition of the invention. Examples of the polymerization inhibitor include hydroquinone, benzoquinone, p-methoxyphenol, TEMPO, TEMPOL, and cupferron A1.

Considering that the ink composition and the ink composition for ink jet recording of the invention are radiation-curable ink compositions, it is preferable that these ink compositions contain no solvent. This is because disuse of a solvent allows the ink composition to react and cure on being deposited on a recording medium. However, the ink composition may contain a predetermined solvent or solvents as long as the solvent(s) does not adversely affect the curing speed of the ink composition. In the invention, the solvent may be an organic solvent or water. In particular, at least one organic solvent may be contained in the ink composition to improve adhesiveness of the ink composition to a recording medium (e.g., support such as paper). Use of an organic solvent or solvents is effective to avoid problems regarding VOC.

The content of the organic solvent(s) is, for example, in the range of 0.1 to 5% by mass, and preferably in the range of 0.1 to 3% by mass with respect to the total mass of the ink composition of the invention.

In addition, the ink composition of the invention may further other known compound(s), if necessary. Examples of such additional compounds include at least one surfactant, at least one leveling additive, at least one matting agent, and at least one resin to adjust the physical properties of a film obtained by curing the ink composition, such as polyester resin, polyurethane resin, vinyl resin, acrylic resin, rubber resin, and wax. Further, the ink composition preferably contains at least one tackifier that does not inhibit polymerization in view of improvement in adhesiveness to recording media made of, for example, polyolefin or PET. Specific examples thereof include high-molecular weight adhesive polymers described in JP-A No. 2001-49200, pp. 5 to 6 (e.g., a copolymer of ester of (meth)acrylic acid and alcohol having at least one alkyl group with 1 to 20 carbon atoms, a copolymer of ester of (meth)acrylic acid and alicyclic alcohol having 3 to 14 carbon atoms, and a copolymer of ester of (meth)acrylic acid and aromatic alcohol having 6 to 14 carbon atoms), and low-molecular weight adhesive resins having polymerizable unsaturated bonds.

[Properties of Ink Composition]

As described above, the ink composition according to each of the aspects of the invention include essential components for each aspect and optionally other polymerizable compound(s), at least one colorant, and other components.

In the invention, the content of the colorant(s) in the ink composition is preferably 1 to 10% by mass, and more preferably 2 to 8% by mass. The total content of at least one polymerizable compound including the carboxy group-containing polymerizable compound(s) or the specific monofunctional (meth)acrylic acid derivative(s) in the ink composition is preferably 5 to 97% by mass, and more preferably 30 to 95% by mass. The content of the polymerization initiator is preferably 0.01 to 35% by mass, more preferably 0.1 to 30% by mass, and even more preferably 0.5 to 30% by mass relative to the at least one polymerizable compound including the carboxy group-containing polymerizable compound(s) or the specific monofunctional (meth)acrylic acid derivative(s).

The ink composition of the invention can be properly used as an ink for ink jet recording. Preferred physical properties in such an embodiment will be described.

When the ink composition of the invention is used as an ink for ink jet recording, the ink composition preferably has good dischargeability. To attain this, the viscosity of the ink composition is preferably 7 to 30 mPa·s, and more preferably 7 to 25 mPa·s at the discharge temperature, which is for example, within the range of 40 to 80° C. and preferably within the range of 25 to 50° C. The viscosity of the ink composition of the invention at room temperature, which is within the range of 25 to 30° C., is preferably 35 to 500 mPa·s, and more preferably 35 to 200 mPa·s.

It is preferable that the composition of the ink composition is so adjusted as to obtain a viscosity within the above range.

When the ink composition has a high viscosity at room temperature, the ink composition can be prevented from penetrating into a recording medium. This is true even when the recording medium is porous. In addition, the amount of uncured monomer molecules and odor can be reduced. Further, bleeding of deposited ink droplets can be suppressed to consequently improve image quality.

The surface tension of the ink composition of the invention is preferably from 20 to 30 mN/m, and more preferably from 23 to 28 mN/m. When a recording medium is made of polyolefin, PET, coated paper, or non-coated paper, the surface tension of the ink composition is preferably 20 mN/m or more in view of prevention of bleeding and penetration of the ink composition, or 30 mN/m or less in view of wettability of the ink composition.

<Ink Jet Recording Method>

The ink composition of the invention is preferably used in ink jet recording.

Hereinafter, an ink jet recording method and an ink jet recording apparatus preferably used in the invention will be described.

The ink jet recording method of the invention includes: discharging an ink composition on a recording medium or a support to conduct ink jet recording (step (a)), and irradiating the ink composition on the recording medium with active radiation rays to cure the ink composition (step (b)) to form an image. In the ink jet recording method, that ink composition is the ink composition of the invention.

As described above, the ink jet recording method of the invention includes steps (a) and (b), and an image is formed on the recording medium by curing the ink composition.

An ink jet recording apparatus, which will be described below in detail, can be used in the step (a) of discharging an ink composition onto a recording medium.

[Ink Jet Recording Apparatus]

There is no limit to the ink jet recording apparatus usable in the recording method of the invention. Any one of known ink jet recording apparatuses that provide images with desired resolution may be used as such. That is, any one of known ink jet recording apparatuses including commercially available products may be used to discharge an ink on a recording medium in the step (a) of the recording method of the invention.

The ink jet recording apparatus for use in the invention has, for example, an ink-supplying system, a temperature sensor, and an active radiation ray source.

The ink-supplying system has, for example, a stock tank that stores the ink composition of the invention, supply pipes, an ink-supplying tank immediately before an ink jet head, a filter, and a piezoelectric ink jet head. Preferably, the piezoelectric ink jet head is designed according to multi size dot technology and can be so driven as to discharge ink droplets having volumes of 1 to 100 pl, preferably 8 to 30 pl, at a definition of, for example, 320×320 to 4,000×4,000 dpi, preferably 400×400 to 1,600×1,600 dpi, and more preferably 720×720 dpi. The term "dpi" in the invention means the number of dots aligned per about 2.54 cm.

As aforementioned, the radiation-curable ink is preferably heated at a constant temperature before the discharge. Therefore, heating and thermal insulation are preferably conducted in a region from the ink-supplying tank to the ink jet head. There is no particular limit to a method of controlling the temperature of the region. For example, temperature sensors are preferably disposed in each of the pipes, so that heating can be controlled according to the flow of ink and environmental temperature. Some temperature sensors may be placed close to the ink-supplying tank and the ink jet head nozzle, respectively. Preferably, the ink jet head, which is used to heat the ink, has a main body that is thermally insulated in order to prevent outside air from affecting the temperature of the head. To shorten rise time necessary to heat the above region to a predetermined temperature or reduce loss in heat energy, it is preferable to thermally insulate the ink jet head from other units and reduce the heat capacity of the entire of a heating unit.

The ink composition of the invention is discharged onto the surface of a hydrophilic support with an ink jet recording apparatus. At this time, it is preferable that the ink composition is heated to 40 to 80° C. (more preferably 25 to 50° C.) to lower the viscosity of the ink composition to 7 to 30 mPa·s (more preferably 7 to 25 mPa·s) before the discharge. The ink composition preferably has a viscosity of 35 to 500 mPa·s at 25° C. to obtain significant effects. In this case, it is possible to realize high discharge stability.

Generally, radiation-curable ink compositions, such as the ink composition of the invention, are more viscous than aqueous inks used as conventional ink jet recording inks. Therefore, fluctuation in temperature during discharge causes the viscosity of the radiation-curable ink compositions to significantly change. The fluctuation in the viscosity of the ink composition gives significant influence on the size of droplets and droplet discharge speed, causing deterioration in image quality. Thus, it is necessary to keep the temperature of the ink composition as constant as possible during discharge. The difference between the real temperature of the ink composition and the set temperature of the ink composition is preferably within ±5° C., more preferably ±2° C., and still more preferably ±1° C.

The step (b) of irradiating the ink composition with active radiation rays to cure the ink composition will be described below.

The ink composition deposited on the recording medium is cured by irradiating the ink composition with active radiation rays. This is because the polymerization initiator(s) contained in the ink composition of the invention is decomposed by irradiation of the active radiation rays to generate initiation species such as radicals, acid, or base, which initiates and accelerates polymerization reaction of the carboxy group-containing polymerizable compound(s) or the acidic group-containing polymerizable compound(s) and, if any, other polymerizable compound(s), and causes the ink composition to cure. When the ink composition contains at least one sensitizing dye as well as the polymerization initiator(s), the sensitizing dye(s) in the ink composition absorbs the active radiation rays and thereby becomes an excited state. When the excited sensitizing dye(s) comes into contact with the polymerization initiator(s), the sensitizing dye(s) accelerates decomposition of the polymerization initiator(s) to attain highly sensitive curing reaction.

Examples of the active radiation rays include α-rays, γ-rays, electron beams, X-rays, ultraviolet rays, visible light and infrared light. A desired peak wavelength for the active radiation rays depends on the absorption property of the sensitizing dye, if any. However, the peak wavelength of the active radiation rays is preferably 200 to 600 nm, more preferably 300 to 450 nm, and still more preferably 350 to 420 nm.

The polymerization initiator in the invention is sufficiently sensitive to radiation rays even at low output. Thus, the output of the radiation rays is preferably 2,000 mJ/cm$^2$ or less, more preferably 10 to 2,000 mJ/cm$^2$, still more preferably 20 to 1,000 mJ/cm$^2$, and most preferably 50 to 800 mJ/cm$^2$.

The illuminance of the active radiation rays at an exposed surface is preferably 10 to 2,000 mW/cm$^2$ and more preferably 20 to 1,000 mW/cm$^2$.

A mercury lamp, or a gas- or solid-state laser is mainly used as the active radiation ray source, and a mercury lamp or metal halide lamp is widely known as the light source to cure a UV-curable ink for ink jet recording. However, there is a strong need for mercury-free devices from the viewpoint of environmental protection. Substitution thereof with a GaN semiconductor ultraviolet ray-emitting device is very useful from the industrial and environmental standpoints. In addition, LED's (UV-LEDs) and LD's (UV-LDs), which have a small size, a long lifetime, a high efficiency and low costs, are attracting attention as light sources for optically curing ink jet printers.

A light-emitting diode (LED) or a laser diode (LD) may be used as the active radiation ray source. In particular, an ultraviolet LED or an ultraviolet LD may be used if an ultraviolet ray source is needed. For example, a purple LED emitting light with a main peak wavelength within the range of 365 to 420 nm is available from Nichia Corporation. If light having a still shorter wavelength is needed, U.S. Pat. No. 6,084,250 discloses an LED that can emit radiation rays having a central wavelength within the range of 300 to 370 nm. Other ultraviolet LEDs are also commercially available. Radiation rays having different ultraviolet ray bands may be irradiated. The radiation ray source in the invention is preferably a UV-LED, and more preferably a UV-LED having a peak wavelength within the range of 350 to 420 nm.

The maximum illuminance of LED on a recording medium is preferably 10 to 2,000 mW/cm$^2$, more preferably 20 to 1,000 mW/cm$^2$, and still more preferably 50 to 800 mJ/cm$^2$.

The time during which the ink composition of the invention is exposed to the active radiation rays is preferably 0.01 to 120 seconds, and more preferably 0.1 to 90 seconds.

Irradiation conditions and a basic method of irradiating active radiation rays are disclosed in JP-A No. S60-132767. Specifically, the active radiation rays are irradiated in a so-called shuttle manner in which a head unit having an ink-discharging element, and light sources placed at both sides of the head unit are driven. The irradiation of the active radiation rays starts when a certain period of time (e.g., 0.01 to 0.5 seconds, preferably 0.01 to 0.3 seconds, and more preferably 0.01 to 0.15 seconds) has lapsed since deposit of the ink on a recording medium. Extremely shortening a time starting at the ink deposition and ending at the start of the irradiation makes it possible to prevent bleeding of the ink deposited on the recording medium before curing. Even when the recording medium is porous, it is possible to irradiate the ink before the ink penetrating into a portion of the recording medium which portion the irradiated rays cannot reach, in this case. Thus, the amount of unreacted residual monomer can be reduced, and odor can be consequently reduced.

Alternatively, the ink may be cured with a fixed light source separated from the head unit. WO 99/54415 discloses an irradiation method in which an optical fiber is used and a method of irradiating recorded areas with UV rays that are collimated and reflected by a mirror placed on the side face of the head unit. These curing methods may also be applied to the recording method of the invention.

By employing the ink jet recording method described above, it becomes possible to deposit ink droplets having a diameter kept constant on the surfaces of various recording media having different surface wettabilities and to improve image quality. To obtain a multi-color image, images of respective colors are preferably formed one by one in the order of increasing luminosities. Formation of images in this manner allows the irradiated rays to reach the lowest ink layer, and good curing sensitivity, decreases in the amount of the residual monomer and odor, and improved adhesiveness may be obtained. Although images of respective colors may be simultaneously irradiated with active radiation rays, it is preferable to separately irradiate the images in order to accelerate curing.

In this way, the ink composition of the invention cures with high sensitivity by irradiation of active radiation rays and forms a hydrophobic image on a recording medium.

<Planographic Printing Plate and Production Method Thereof>

A planographic printing plate can be produced by applying the ink composition of the invention to a hydrophilic support in accordance with the ink jet recording method of the invention and curing the ink composition.

Hereinafter, a method of producing a planographic printing plate including discharging an ink composition on a support for a planographic printing plate to form an image and a planographic printing plate of the invention obtained by using this method will be described.

The planographic printing plate of the invention has a hydrophilic support and a hydrophobic image on the hydrophilic support. A method of producing the planographic printing plate includes: a step (a) of discharging the ink composition of the invention on a hydrophilic support, and a step (b) of irradiating the ink composition with active radiation rays to cure the ink composition to form a hydrophobic image of the cured ink composition on the hydrophilic support.

Thus, a planographic printing plate can be produced by a method that is the same as the ink jet recording method of the invention except that the recording medium is a support having a hydrophilic surface and preferably used as a support for a planographic printing plate.

Hydrophilic Support for Planographic Printing Plate

The planographic printing plate of the invention has a hydrophilic support and a hydrophobic image disposed on the support and obtained by curing the ink composition of the invention, as aforementioned.

As described previously, planographic printing plates have been produced by image-wise exposing a so-called PS plate having an oleophilic photosensitive resin layer on a hydrophilic support to light to solubilize or cure exposed regions to form a latent image, and dissolving and removing non-image regions. A planographic printing plate can be easily prepared by applying the ink jet recording method of the invention to the production method thereof, namely by discharging an ink composition directly on a support according to digitized image information and curing the ink composition.

The support for a planographic printing plate (recording medium) to which the ink composition of the invention or the ink for ink jet recording is discharged is a plate with stable dimensions and otherwise there is no particular limit thereto. However, the support preferably has a hydrophilic surface to obtain printed matter with high image quality.

At least one hydrophilic substance may be used as it is to prepare a support. When at least one non-hydrophilic substance is used to prepare a support, the surface of the support may be subjected to hydrophilidizing treatment.

Examples of the material of the support include paper, paper on which at least one plastic material (e.g., polyethylene, polypropylene, or polystyrene) is laminated, plates of metal (e.g., aluminum, zinc or copper), films of plastic (e.g., cellulose diacetate, cellulose triacetate, cellulose propionate, cellulose butyrate, cellulose acetate butyrate, cellulose nitrate, polyethylene terephthalate, polyethylene, polystyrene, polypropylene, polycarbonate, or polyvinyl acetal), and paper and plastic films on which at least one of those metals is laminated or deposited. The support is preferably a polyester film or an aluminum plate. Above all, the support is more preferably an aluminum plate because of good dimensional stability and relative inexpensiveness.

The aluminum plate is preferably a pure aluminum plate or an alloy plate containing aluminum as the main component and a trace amount of other elements, or a composite plate in which at least one plastic film is laminated on an aluminum or an aluminum alloy film. Examples of elements other than aluminum and contained in the aluminum alloy include silicon, iron, manganese, copper, magnesium, chromium, zinc, bismuth, nickel, and titanium. The content of these elements in the alloy is preferably 10% by mass or less. Although the support is most preferably a pure aluminum plate in the invention, it is difficult to refine and prepare completely pure aluminum. Therefore, the support may contain a trace amount of elements other than aluminum. There is no limit to the composition of the aluminum plate, and any one of known aluminum plates may be used as the support.

The thickness of the aluminum plate is preferably 0.1 mm to 0.6 mm, and more preferably 0.15 mm to 0.4 mm.

The aluminum plate is preferably subjected to surface treatment such as surface-roughening treatment or anodizing treatment before an image is formed on the aluminum plate. Hydrophilicity of the support and adhesion between an image recording layer and the support can be improved by the surface treatment. Before the surface-roughening treatment, the aluminum plate is degreased with, for example, a surfactant, an organic solvent, or an aqueous alkaline solution to remove a rolling oil on the surface thereof, if necessary.

Various methods may be used for surface roughening of the aluminum plate. Examples thereof include mechanical surface-roughening treatment, electrochemical surface-roughening treatment (surface-roughening by dissolving the surface of the aluminum plate electrochemically), and chemical surface-roughening treatment (surface-roughening by dissolving the surface selectively and chemically).

Any one of known methods such as a ball polishing method, a brush polishing method, a blast polishing method, and a buff polishing method may be used in the mechanical surface-roughening treatment. Alternatively, a method in which the surface is provided with unevennesses by a roll having an uneven surface during rolling of aluminum may be used.

The electrochemical surface-roughening may be performed by, for example, applying an alternate or direct current to the support in an electrolytic solution containing acid such as hydrochloric acid or nitric acid. The acid may also be a mixed acid described in JP-A No. S54-63902.

The aluminum plate after surface-roughening treatment may be alkali-etched with an aqueous solution containing, for example, potassium hydroxide or sodium hydroxide, neutralized, and, to improve the abrasion resistance of the support, anodized, if necessary.

At least one electrolyte is used in the anodizing of the aluminum plate and any of electrolytes that form a porous oxide film may be used as such. The electrolyte used in the anodizing is generally sulfuric acid, hydrochloric acid, oxalic acid, chromic acid, or a mixed acid thereof. A desired concentration for the electrolyte depends on the kind of the electrolyte.

The conditions of the anodizing depend on the type of the electrolyte used, and are not clearly defined. However, the concentration of the electrolyte(s) is preferably 1 to 80% by mass, and the temperature of the electrolytic solution is preferably 5 to 70° C., and the density of electric current is preferably 5 to 60 A/dm$^2$, and the voltage is preferably 1 to 100 V, and the electrolysis time is preferably 10 seconds to 5 minutes. The amount of the anodic oxide film formed is preferably 1.0 to 5.0 g/m$^2$, and more preferably 1.5 to 4.0 g/m$^2$. When the anodic oxide film has a coating amount within the above range, the support for a planographic printing plate has good printing durability and good scratch resistance.

The support having the above-treated surface and having thereon the anodic oxide film described above may be used as it is, in the invention. However, the support may be subjected to further treatment, such as treatment for expanding or sealing micropores of the anodic oxide film described in JP-A Nos. 2001-253181 and 2001-322365, or surface-hydrophilizing treatment that includes immersing the support in an aqueous solution containing at least one hydrophilic compound, in order to improve adhesion of the support and a layer formed thereon, hydrophilicity, and/or staining resistance, if necessary. The micropore expanding and sealing are not limited to the methods described above, and any one of known methods may be used as such.

[Micropore Sealing]

The micropore sealing may be performed with vapor, fluorozirconic acid alone, an aqueous solution containing at least one inorganic fluorine compound such as sodium fluoride, vapor including lithium chloride, or hot water.

Among these, the micropore sealing is preferably conducted with an aqueous solution containing at least one inorganic fluorine compound, steam, or hot water. Each of these will be described below.

<Micropore Sealing with Aqueous Solution Containing Inorganic Fluorine Compound>

The inorganic fluorine compound contained in the aqueous solution used in the micropore sealing is preferably metal fluoride.

Examples thereof include sodium fluoride, potassium fluoride, calcium fluoride, magnesium fluoride, sodium fluorozirconate, potassium fluorozirconate, sodium fluorotitanate, potassium fluorotitanate, ammonium fluorozirconate, ammonium fluorotitanate, potassium fluorotitanate, fluorozirconic acid, fluorotitanic acid, hexafluorosilicic acid, nickel fluoride, iron fluoride, fluorophosphoric acid, and ammonium fluorophosphate. Among them, the inorganic fluorine compound is preferably sodium fluorozirconate, sodium fluorotitanate, fluorozirconic acid, or fluorotitanic acid.

The concentration of the inorganic fluorine compound(s) in the aqueous solution is preferably 0.01% by mass or higher, and more preferably 0.05% by mass or higher to sufficiently seal micropores of the anodic oxide film. Moreover, the concentration of the inorganic fluorine compound(s) in the aqueous solution is preferably 1% by mass or lower, and more preferably 0.5% by mass or lower in view of stain resistance.

Preferably, the aqueous solution containing at least one inorganic fluorine compound further contains at least one phosphate compound. When the phosphate compound is contained in the aqueous solution, the hydrophilicity of the surface of the anodic oxide film is improved, improving developability in a printing apparatus and stain resistance.

The phosphate compound is preferably selected from metal phosphates such as phosphates of alkali metals and phosphates of alkaline earth metals.

Specific examples thereof include zinc phosphate, aluminum phosphate, ammonium phosphate, diammonium hydrogen phosphate, ammonium dihydrogen phosphate, monoammonium phosphate, monopotassium phosphate, monosodium phosphate, potassium dihydrogen phosphate, dipotassium hydrogen phosphate, calcium phosphate, sodium ammonium hydrogen phosphate, magnesium hydrogen phosphate, magnesium phosphate, ferrous phosphate, ferric phosphate, sodium dihydrogen phosphate, sodium phosphate, disodium hydrogen phosphate, lead phosphate, diammonium phosphate, calcium dihydrogen phosphate, lithium phosphate, phosphotungstic acid, ammonium phosphotungstate, sodium phosphotungstate, ammonium phosphomolybdate, sodium phosphomolybdate, sodium phosphite, sodium tripolyphosphate and sodium pyrophosphate. Among these, the phosphate compound is preferably sodium dihydrogen phosphate, disodium hydrogen phosphate, potassium dihydrogen phosphate or dipotassium hydrogen phosphate.

There is no particular limit to a combination of the inorganic fluorine compound(s) and the phosphate compound(s). Preferably, the aqueous solution contains sodium fluorozirconate as the inorganic fluorine compound and sodium dihydrogen phosphate as the phosphate compound.

The concentration of the phosphate compound(s) in the aqueous solution is preferably 0.01% by mass or higher, and more preferably 0.1% by mass or higher to improve developability in a printing apparatus and stain resistance. The concentration of the phosphate compound(s) in the aqueous solution is preferably 20% by mass or lower, and more preferably 5% by mass or lower in respect of solubility of the phosphate compound.

There is no particular limit to the rate of each of the compounds in the aqueous solution. The mass ratio of the inorganic fluorine compound(s) to the phosphate compound(s) is preferably in the range of 1/200 to 10/1, and more preferably in the range of 1/30 to 2/1.

The temperature of the aqueous solution is preferably 20° C. or higher, and more preferably 40° C. or higher, but preferably 100° C. or lower, and more preferably 80° C. or lower.

The pH of the aqueous solution is preferably 1 or higher, and more preferably 2 or higher, but preferably 11 or lower, and more preferably 5 or lower.

There is no particular limit to a method of sealing micropores with the aqueous solution containing at least one inorganic fluorine compound. The method can be an immersion method or a spraying method. One of these methods can be conducted alone, or two or more of them may be used together. Each sealing treatment may be conducted only once, or may be conducted twice or more.

The sealing treatment is preferably conducted by an immersion method. When an immersion method is used in the treatment, the treatment time is preferably at least 1 second, and more preferably at least 3 seconds, but preferably 100 seconds or shorter, and more preferably 20 seconds or shorter.

<Sealing with Steam>

The sealing with steam may be conducted by, for example, continuously or intermittently bringing the anodic oxide film into contact with pressurized steam or steam of normal pressure.

The temperature of the steam is preferably 80° C. or higher, and more preferably 95° C. or higher, but preferably 105° C. or lower.

The pressure of the steam is preferably in the range of a value obtained by subtracting 50 mmAq from atmospheric pressure to a value obtained by adding 300 mmAq to atmospheric pressure. Specifically, the pressure of the steam is preferably in the range of $1.008 \times 10^5$ to $1.043 \times 10^5$ Pa.

The duration during which the anodic oxide film is brought into contact with steam is preferably 1 second or longer, and more preferably 3 seconds or longer, but preferably 100 seconds or shorter, and more preferably 20 seconds or shorter.

<Sealing with Hot Water>

The sealing with hot water may be conducted by, for example, immersing the aluminum plate having an anodic oxide film thereon in hot water.

The hot water may contain at least one inorganic salt (for example, a phosphate) and/or at least one organic salt.

The temperature of the hot water is preferably 80° C. or higher, and more preferably 95° C. or higher, but preferably 100° C. or lower.

The immersion time is preferably 1 second or longer, and more preferably 3 seconds or longer, but preferably 100 seconds or shorter, and more preferably 20 seconds or shorter.

The hydrophilizing may be conducted by an alkali metal silicate method such as those disclosed in U.S. Pat. Nos. 2,714,066, 3,181,461, 3,280,734, and 3,902,734. In this method, a support is immersed or electrolyzed in an aqueous solution of sodium silicate. Alternatively, the hydrophilizing can be performed by a method disclosed in JP-B No. S36-22063. In the method, a support is processed with potassium fluorozirconate. The hydrophilizing may also be conducted by a method such as those disclosed in U.S. Pat. Nos. 3,276,868, 4,153,461, and 4,689,272. In the method, a support is processed with polyvinyl phosphonic acid.

The support of the invention preferably has a center-line average roughness of 0.10 to 1.2 µm. The support whose center-line average roughness is within the above range has good adhesiveness to a hydrophobic image, good printing durability, and good staining resistance.

(a) Discharging Ink Composition onto Hydrophilic Support

First, the ink composition of the invention is discharged onto a hydrophilic support. A conventionally known ink jet recording apparatus can be used in this step, as in the above-mentioned ink jet recording method. Further, the preferred ranges of the temperature and viscosity of the ink, and a method for controlling these in discharging the ink with this ink jet recording apparatus, are the same as in the ink jet recording method.

(b) Irradiating Ink Composition with Active Radiation Rays to Form Hydrophobic Image The ink composition deposited on the hydrophilic support is irradiated with active radiation rays to cure the ink composition. The details of the curing mechanism are the same as in the aforementioned ink jet recording method. An active radiation ray source used to cure the ink composition and the preferred irradiation conditions are the same as in the ink jet recording method.

Using the ink jet recording method makes it possible to deposit dots having a constant diameter on various supports for planographic printing plates that are different in surface wettability, resulting in improved image quality. In this way, a planographic printing plate can be produced by irradiating the ink composition of the invention with active radiation rays to cure the ink composition and to form a hydrophobic image on the surface of the hydrophilic support.

Because the ink composition of the invention is cured with high sensitivity by irradiation of active radiation rays to form a hydrophobic region or regions (film or films) having good adhesiveness to a support and good film properties, the planographic printing plate obtained has high image quality, good film properties and good printing durability.

The ink composition of the invention is useful not only in forming the image region or regions of a planographic printing plate, but also as an ordinary ink composition.

EXAMPLES

Hereinafter, the invention will be described with reference to Examples, but the invention is not limited to these Examples. The following Examples relates to ink compositions for UV ink jet recording having various colors. The term "part" means "part by mass", unless otherwise indicated Example 1

The following components were stirred with a high-speed water cooling-type stirrer to obtain a cyan ink composition for UV ink jet recording.

| Composition of cyan ink | |
|---|---|
| Carboxy group-containing polymerizable compound A-6 | 15.4 parts |
| ACTILANE 421 | 36.0 parts |
| (*: Acrylate monomer manufactured by Akcros Chemicals Ltd.)(other polymerizable compound) | |
| PHOTOMER 2017 (UV diluent manufactured by EChem) | 20.0 parts |
| SOLSPERSE 32000 (Dispersant manufactured by Noveon Inc.) | 0.4 parts |
| IRGALITE BLUE GLVO (Pigment manufactured by Ciba Specialty Chemicals Ltd.)(colorant) | 3.6 parts |
| GENORAD 16 (Stabilizer manufactured by Rahn AG) | 0.05 parts |
| RAPI-CURE DVE-3 (Vinyl ether manufactured by ISP Europe)(other polymerizable compound) | 8.0 parts |
| LUCIRIN TPO (Photopolymerization initiator manufactured by BASF Corporation) | 8.5 parts |
| Benzophenone (Photopolymerization initiator) | 4.0 parts |
| IRGACURE 184 (Photopolymerization initiator manufactured by Ciba Specialty Chemicals Ltd.) | 4.0 parts |
| BYK 307 (Antifoaming agent manufactured by BYK Chemie GmbH) | 0.05 parts |

The product "ACTILANE 421" is propoxylated neopentyl glycol diacrylate (bifunctional acrylate).

Evaluation of Ink Composition

The cyan ink composition was set in an ink jet recording apparatus. The ink was discharged onto a sheet made of polyvinyl chloride with the ink jet recording apparatus, and the sheet was irradiated with light by allowing the sheet to pass through the position under an iron-doped ultraviolet ray lamp (power of 120 W/cm$^2$) at a velocity of 40 m/min. Thereby, the ink thereon was cured to form printed matter with an image.

The image was evaluated with respect to the following items. The evaluation procedures are as follows.

The exposure energy supplied to the ink composition during the curing was measured with an integral actinometer (UV Power MAP manufactured by EIT). As a result, the integral ultraviolet-ray exposure on the sheet was approximately 330 mJ/cm$^2$, and it was confirmed that the ink had been cured with high sensitivity.

The curing property of the ink composition was evaluated by checking whether the image of the printed matter soiled a finger (finger test). As a result, the image did not soil the finger. Thus, it was confirmed that the ink composition has a good curing property.

The adhesiveness between the image and the sheet was determined according to a crosshatch test (EN ISO2409, the disclosure of which is incorporated by reference), was classified as class 4B, which is high level adhesiveness. Flexibility of the image was evaluated by folding the sheet ten times and checking the degree of cracks, if any, of the image. Results of this folding test were evaluated on a scale of 1 to 5. Grade 5 shows that no crack occurred, and grades 3 to 5 are practically acceptable. The sheet that had been subjected to the folding test had slight cracks that did not adversely affect the printed image, and was ranked as grade 4.

The results are shown in Table 1.

Example 2

The following components were stirred with a high-speed water cooling-type stirrer to obtain a magenta ink composition for UV ink jet recording.

| Composition of magenta ink | |
|---|---|
| Carboxy group-containing polymerizable compound A-6 | 10.4 parts |
| Carboxy group-containing polymerizable compound A-15 | 3.0 parts |
| ACTILANE 421 (Acrylate monomer manufactured by Akcros Chemicals Ltd.)(other polymerizable compound) | 38.0 parts |
| PHOTOMER 2017 (UV diluent manufactured by EChem) | 20.0 parts |
| SOLSPERSE 32000 (Dispersant manufactured by Noveon Inc.) | 0.4 parts |
| CINQUASIA MAGENTA RT-355D (Pigment manufactured by Ciba Specialty Chemicals Ltd.)(colorant) | 3.6 parts |
| GENORAD 16 (Stabilizer manufactured by Rahn AG) | 0.05 parts |
| RAPI-CURE DVE-3 (Vinyl ether manufactured by ISP Europe)(other polymerizable compound) | 8.0 parts |
| LUCIRIN TPO (Photopolymerization initiator manufactured by BASF Corporation) | 8.5 parts |
| Benzophenone (Photopolymerization initiator) | 4.0 parts |
| IRGACURE 184 (Photopolymerization initiator manufactured by Ciba Specialty Chemicals Ltd.) | 4.0 parts |
| BYK 307 (Antifoaming agent manufactured by BYK Chemie GmbH) | 0.05 parts |

The magenta ink composition was set in an ink jet recording apparatus. The ink was discharged onto a sheet made of polyvinyl chloride with the ink jet recording apparatus, and the sheet was irradiated with light by allowing the sheet to pass through the position under the iron-doped ultraviolet ray lamp (power of 120 W/cm$^2$) at a velocity of 40 m/min. The resultant printed matter having an image obtained by curing the ink composition was evaluated in the same manner as in Example 1. The results are shown in Table 1.

Example 3

The following components were stirred with a high-speed water cooling-type stirrer to obtain a yellow ink composition for UV ink jet recording.

| Composition of yellow ink | |
|---|---|
| Carboxy group-containing polymerizable compound A-7 | 7.4 parts |
| ACTILANE 421 (Acrylate monomer manufactured by Akcros Chemicals Ltd.)(other polymerizable compound) | 48.0 parts |
| PHOTOMER 2017 (UV diluent manufactured by EChem) | 20.0 parts |
| SOLSPERSE 32000 (Dispersant manufactured by Noveon Inc.) | 0.4 parts |
| CROMOPHTAL YELLOW LA (Pigment manufactured by Ciba Specialty Chemicals Ltd.) | 3.6 parts |
| GENORAD 16 (Stabilizer manufactured by Rahn AG) | 0.05 parts |
| RAPI-CURE DVE-3 (Vinyl ether manufactured by ISP Europe)(other polymerizable compound) | 4.0 parts |
| LUCIRIN TPO (Photopolymerization initiator manufactured by BASF Corporation) | 8.5 parts |
| Benzophenone (Photopolymerization initiator) | 4.0 parts |
| IRGACURE 184 (Photopolymerization initiator manufactured by Ciba Specialty Chemicals Ltd.) | 4.0 parts |
| BYK 307 (Antifoaming agent manufactured by BYK Chemie GmbH) | 0.05 parts |

The yellow ink composition was set in an ink jet recording apparatus. The ink was discharged onto a sheet made of polyvinyl chloride with the ink jet recording apparatus, and the sheet was irradiated with light by allowing the sheet to pass through the position under the iron-doped ultraviolet ray lamp (power of 120 W/cm$^2$) at a velocity of 40 m/min. The resultant printed matter having an image obtained by curing the ink composition was evaluated in the same manner as in Example 1. The results are shown in Table 1.

Example 4

The following components were stirred with a high-speed water cooling-type stirrer to obtain a black ink composition for UV ink jet recording.

| Composition of black ink | |
|---|---|
| Carboxy group-containing polymerizable compound A-6 | 21.4 parts |
| ACTILANE 421 (Acrylate monomer manufactured by Akcros Chemicals Ltd.)(other polymerizable compound) | 34.0 parts |
| PHOTOMER 2017 (UV diluent manufactured by EChem) | 20.0 parts |
| SOLSPERSE 32000 (Dispersant manufactured by Noveon Inc.) | 0.4 parts |
| MICROLITH BLACK C-K (Pigment manufactured by Ciba Specialty Chemicals Ltd.)(colorant) | 2.6 parts |
| GENORAD 16 (Stabilizer manufactured by Rahn AG) | 0.05 parts |
| RAPI-CURE DVE-3 (Vinyl ether manufactured by ISP Europe)(other polymerizable compound) | 5.0 parts |
| LUCIRIN TPO (Photopolymerization initiator manufactured by BASF Corporation) | 8.5 parts |
| Benzophenone (Photopolymerization initiator) | 4.0 parts |
| IRGACURE 184 (Photopolymerization initiator manufactured by Ciba Specialty Chemicals Ltd.) | 4.0 parts |
| BYK 307 (Antifoaming agent manufactured by BYK Chemie GmbH) | 0.05 parts |

The black ink composition was set in an ink jet recording apparatus. The ink was discharged onto a sheet made of polyvinyl chloride with the ink jet recording apparatus, and the sheet was irradiated with light by allowing the sheet to pass through the position under the iron-doped ultraviolet ray lamp (power of 120 W/cm$^2$) at a velocity of 40 m/min. The resultant printed matter having an image obtained by curing the ink composition was evaluated in the same manner as in Example 1. The results are shown in Table 1.

Example 5

The following components were stirred with a high-speed water cooling-type stirrer to obtain a cyan ink composition for UV ink jet recording.

| Composition of cyan ink | |
|---|---|
| Carboxy group-containing polymerizable compound A-1 | 25.4 parts |
| ACTILANE 422 (Acrylate monomer manufactured by Akcros Chemicals Ltd.)(other polymerizable compound) | 48.0 parts |
| SOLSPERSE 32000 (Dispersant manufactured by Noveon Inc.) | 0.4 parts |
| IRGALITE BLUE GLVO (Pigment manufactured by Ciba Specialty Chemicals Ltd.)(colorant) | 3.6 parts |
| GENORAD 16 (Stabilizer manufactured by Rahn AG) | 0.05 parts |
| RAPI-CURE DVE-2 (Vinyl ether manufactured by ISP Europe)(other polymerizable compound) | 6.0 parts |
| LUCIRIN TPO (Photopolymerization initiator manufactured by BASF Corporation) | 8.5 parts |
| Benzophenone (Photopolymerization initiator) | 4.0 parts |

| Composition of cyan ink | |
|---|---|
| IRGACURE 184 (Photopolymerization initiator manufactured by Ciba Specialty Chemicals Ltd.) | 4.0 parts |
| BYK 307 (Antifoaming agent manufactured by BYK Chemie GmbH) | 0.05 parts |

* ACTILANE 422 is dipropylene glycol diacrylate (bifunctional acrylate).

The cyan ink composition was set in an ink jet recording apparatus. The ink was discharged onto a sheet made of polyvinyl chloride with the ink jet recording apparatus, and the sheet was irradiated with light by allowing the sheet to pass through the position under the iron-doped ultraviolet ray lamp (power of 120 W/cm$^2$) at a velocity of 40 m/min. The resultant printed matter having an image obtained by curing the ink composition was evaluated in the same manner as in Example 1. The results are shown in Table 1.

Example 6

The following components were stirred with a high-speed water cooling-type stirrer to obtain a cyan ink composition for UV ink jet recording.

| Composition of cyan ink | |
|---|---|
| Carboxy group-containing polymerizable compound A-6 | 15.0 parts |
| KAYARAD HDDA (* Acrylate monomer manufactured by Nippon Kayaku Co., Ltd.)(other polymerizable compound) | 2.6 parts |
| ACTILANE 421 (Acrylate monomer manufactured by Akcros Chemicals Ltd.)(other polymerizable compound) | 61.0 parts |
| SOLSPERSE 32000 (Dispersant manufactured by Noveon Inc.) | 0.4 parts |
| SOLSPERSE 5000 (Dispersant manufactured by Noveon Inc.) | 0.05 parts |
| IRGALITE BLUE GLVO (Pigment manufactured by Ciba Specialty Chemicals Ltd.) | 1.4 parts |
| GENORAD 16 (Stabilizer manufactured by Rahn AG) | 0.05 parts |
| RAPI-CURE DVE-3 (Vinyl ether manufactured by ISP Europe)(other polymerizable compound) | 5.0 parts |
| LUCIRIN TPO (Photopolymerization initiator manufactured by BASF Corporation) | 8.0 parts |
| Benzophenone (Photopolymerization initiator) | 2.0 parts |
| IRGACURE 184 (Photopolymerization initiator manufactured by Ciba Specialty Chemicals Ltd.) | 4.0 parts |
| BYK 307 (Antifoaming agent manufactured by BYK Chemie GmbH) | 0.5 parts |

* KAYARAD HDDA is 1,6-hexanediol diacrylate (bifunctional acrylate).

The cyan ink composition was set in an ink jet recording apparatus. The ink was discharged onto a sheet made of polyvinyl chloride with the ink jet recording apparatus, and the sheet was irradiated with light by allowing the sheet to pass through the position under the iron-doped ultraviolet ray lamp (power of 120 W/cm$^2$) at a velocity of 40 m/min. The resultant printed matter having an image obtained by curing the ink composition was evaluated in the same manner as in Example 1. The results are shown in Table 1.

Comparative Example 1

The following components were stirred with a high-speed water cooling-type stirrer to obtain a cyan ink composition for UV ink jet recording.

| Composition of cyan ink | |
|---|---|
| LIGHT ACRYLATE L-A (*Acrylate monomer manufactured by Kyosei Chemical Co., Ltd.)(other polymerizable compound) | 15.4 parts |
| ACTILANE 421 (Acrylate monomer manufactured by Akcros Chemicals Ltd.)(other polymerizable compound) | 36.0 parts |
| PHOTOMER 2017 (UV diluent manufactured by EChem) | 20.0 parts |
| SOLSPERSE 32000 (Dispersant manufactured by Noveon Inc.) | 0.4 parts |
| IRGALITE BLUE GLVO (Pigment manufactured by Ciba Specialty Chemicals Ltd.)(colorant) | 3.6 parts |
| GENORAD 16 (Stabilizer manufactured by Rahn AG) | 0.05 parts |
| RAPI-CURE DVE-3 (Vinyl ether manufactured by ISP Europe)(other polymerizable compound) | 8.0 parts |
| LUCIRIN TPO (Photopolymerization initiator manufactured by BASF Corporation) | 8.5 parts |
| Benzophenone (Photopolymerization initiator) | 4.0 parts |
| IRGACURE 184 (Photopolymerization initiator manufactured by Ciba Specialty Chemicals Ltd.) | 4.0 parts |
| BYK 307 (Antifoaming agent manufactured by BYK Chemie GmbH) | 0.05 parts |

* LIGHT ACRYLATE L-A is lauryl acrylate (monofunctional acrylate).

The cyan ink composition was set in an ink jet recording apparatus. The ink was discharged onto a sheet made of polyvinyl chloride with the ink jet recording apparatus, and the sheet was irradiated with light by allowing the sheet to pass through the position under the iron-doped ultraviolet ray lamp (power of 120 W/cm$^2$) at a velocity of 40 m/min. The resultant printed matter having an image obtained by curing the ink composition was evaluated in the same manner as in Example 1. The results are shown in Table 1.

Comparative Example 2

The following components were stirred with a high-speed water cooling-type stirrer to obtain a cyan ink composition for UV ink jet recording.

| Composition of cyan ink | |
|---|---|
| ACTILANE 421 (Acrylate monomer manufactured by Akcros Chemicals Ltd.)(other polymerizable compound) | 51.4 parts |
| PHOTOMER 2017 (UV diluent manufactured by EChem) | 20.0 parts |
| SOLSPERSE 32000 (Dispersant manufactured by Noveon Inc.) | 0.4 parts |
| IRGALITE BLUE GLVO (Pigment manufactured by Ciba Specialty Chemicals Ltd.)(colorant) | 3.6 parts |
| GENORAD 16 (Stabilizer manufactured by Rahn AG) | 0.05 parts |
| RAPI-CURE DVE-3 (Vinyl ether manufactured by ISP Europe)(other polymerizable compound) | 8.0 parts |
| LUCIRIN TPO (Photopolymerization initiator manufactured by BASF Corporation) | 8.5 parts |
| Benzophenone (Photopolymerization initiator) | 4.0 parts |
| IRGACURE 184 (Photopolymerization initiator manufactured by Ciba Specialty Chemicals Ltd.) | 4.0 parts |
| BYK 307 (Antifoaming agent manufactured by BYK Chemie GmbH) | 0.05 parts |

The cyan ink composition was set in an ink jet recording apparatus. The ink was discharged onto a sheet made of polyvinyl chloride with the ink jet recording apparatus, and the sheet was irradiated with light by allowing the sheet to pass through the position under the iron-doped ultraviolet ray lamp (power of 120 W/cm$^2$) at a velocity of 40 m/min. The resultant printed matter having an image obtained by curing the ink composition was evaluated in the same manner as in Example 1. The results are shown in Table 1.

TABLE 1

|  | Curability | Cross-hatch test | Folding test |
|---|---|---|---|
| Example 1 | Good | 3B | 4 |
| Example 2 | Good | 3B | 4 |
| Example 3 | Good | 3B | 4 |
| Example 4 | Good | 4B | 4 |
| Example 5 | Good | 4B | 5 |
| Example 6 | Good | 3B | 4 |
| Comparative Example 1 | Poor | — | — |
| Comparative Example 2 | Good | 1B | 2 |

As is clearly shown in Table 1, all of the ink compositions of Examples 1 to 6 were cured with high sensitivity, and enabled formation of image portions with an excellent curing property, strong adhesiveness to the sheet serving as a recording medium, and excellent flexibility.

Meanwhile, the ink composition of Comparative Example 1 that included no carboxy group-containing polymerizable compound and included monofunctional acrylate as a polymerizable compound had insufficient curability. The ink composition of Comparative Example 2 that included no carboxy group-containing polymerizable compound and included bifunctional acrylate as the main component thereof exhibited good curability, but the cured film had insufficient flexibility and adhesiveness, and therefore noticeable cracks, which are not practically acceptable, occurred in the cured film by folding the sheet.

Example 7

Preparation of Support

Molten aluminum was prepared by melting an aluminum alloy containing 0.06 mass % of silicon, 0.30 mass % of iron, 0.025 mass % of copper, 0.001 mass % of manganese, 0.001 mass % of magnesium, 0.001 mass % of zinc, 0.03 mass % of titanium, a trace amount of unavoidable impurities, and the remaining of aluminum. The molten aluminum was subjected to a process necessary to obtain a desired casting, filtered and molded into ingots having a thickness of 500 mm and a width of 1,200 mm by DC casting. The surface portion of the ingot which surface portion had an average depth of 10 mm was shaved off by a facing attachment, and the ingot was soaked at 550° C. for approximately 5 hours. After the ingot cooled to 400° C., the ingot was rolled into a rolled plate having a thickness of 2.7 mm with a hot rolling mill. The plate was heated at 500° C. with a continuous annealing machine and cold-rolled into an aluminum plate having a thickness of 0.24 mm, which satisfied the requirements stipulated in JIS 1050. As for the average size of the aluminum crystals in the aluminum plate, the minor and major axes were 50 µm and 300 µm, respectively. After a piece having a width of 1,030 mm was cut from the aluminum plate, the piece was subjected to the following surface treatment so as to prepare an aluminum support.

<Surface Treatment>

The aluminum support was continuously subjected to the following treatments (a) to (j). The processing solution remaining on the aluminum plate was removed by a nip roller, after each treatment and washing with water.

(a) Mechanical Surface Roughening Treatment

The aluminum plate was surface-roughened mechanically with revolving nylon brush rollers, while a polishing slurry containing an abrasive (pumice) having a specific gravity of 1.12 and water was supplied to the surface of the aluminum plate. The average diameter of the abrasive particles was 30 µm, and the maximum diameter was 100 µm. Each of the nylon brush rollers was made of 6.10 nylon, and had bristles whose length and diameter were 45 mm and 0.3 mm, respectively. Each of the nylon brush rollers was prepared by drilling a stainless steel tube having a diameter of 300 mm and densely bristling the stainless steel tube in the holes thereof. The number of the revolving nylon brush rollers was three. Two support rollers (diameter of 200 mm) were disposed below the brush rollers, with the distance therebetween being 300 mm. The brush rollers were pressed against the aluminum plate so that the load of a drive motor that rotated the brush rollers during the pressing was 7 kW heavier than that before the roller was pressed. The rotation direction of the brush rollers was the same as the traveling direction of the aluminum plate. The rotational frequency of the brush rollers was 200 rpm.

(b) Alkaline Etching Treatment

The aluminum plate thus obtained was etched by spraying it with an aqueous solution containing 2.6 mass % of caustic soda and 6.5 mass % of aluminum ions and kept at a temperature of 70° C. Thereby, the aluminum plate was dissolved so that the amount of dissolved aluminum was 10 g/m$^2$. The aluminum plate was then washed with water by spraying.

(c) Desmutting Treatment

The aluminum plate was desmutted by spraying it with an aqueous solution kept at a temperature of 30° C. and containing 1 mass % of nitric acid and 0.5 mass % of aluminum ions. The aluminum plate was then washed with water by spraying. The aqueous solution containing nitric acid used in the desmutting was the waste water discharged from the following step of electrochemical surface-roughening treatment using AC current in an aqueous nitric acid solution.

(d) Electrochemical Surface-Roughening Treatment

The aluminum plate was surface-roughened electrochemically, continuously, while AC voltage having a frequency of 60 Hz was used. The electrolytic solution used in this treatment was an aqueous solution containing 10.5 g/L of nitric acid, 5 g/L of aluminum ions and 0.007 mass % of ammonium ions, and the temperature of the electrolytic solution was 50° C. In the electrochemical surface-roughening treatment, an alternate current having trapezoidal, rectangular waves with a period, which was necessary to raise an electric current value from zero to the peak, of 0.8 msec and a duty ratio of 1:1 was used, and a carbon electrode was used as a counter electrode. A ferrite anode was used as an auxiliary anode.

The electric current density was 30 A/dm$^2$ at a peak current value. The total amount of electric current at the time when the aluminum plate was used as the anode was 220 C/dm$^2$. Part (5%) of the current from power source was supplied to the auxiliary electrode. Subsequently, the aluminum plate was washed with water by spraying.

(e) Alkaline Etching Treatment

The aluminum plate was etched by spraying it with an aqueous solution containing 26 mass % of caustic soda and 6.5 mass % of aluminum ions and kept at 32° C. Thereby, the aluminum plate was dissolved so that the amount of dissolved aluminum was 0.50 g/m$^2$. Smuts including as the main component aluminum hydroxide and occurred in the electrochemical surface-roughening treatment using AC current were removed and the edge regions of the resultant pits were dissolved to smoothen the edge regions. Subsequently, the aluminum plate was washed with water by spraying.

(f) Desmutting Treatment

The aluminum plate was desmutted by spraying it with an aqueous solution kept at a temperature of 30° C. and containing 15 mass % of nitric acid and 4.5 mass % of aluminum ions. The aluminum plate was then washed with water by spraying. The aqueous solution containing nitric acid used in the desmutting was the waste water discharged from the aforementioned step of electrochemical surface-roughening treatment using AC current in an aqueous nitric acid solution.

(g) Electrochemical Surface-Roughening Treatment

The aluminum plate was surface-roughened electrochemically, continuously, while AC voltage having a frequency of 60 Hz was used. The electrolytic solution used in this treatment was an aqueous solution containing 5.0 g/L of hydrochloric acid and 5 g/L of aluminum ions, and the temperature of the electrolytic solution was 35° C. In the electrochemical surface-roughening treatment, an alternate current having trapezoidal, rectangular waves with a period, which was necessary to raise an electric current value from zero to the peak, of 0.8 msec and a duty ratio of 1:1 was used, and a carbon electrode was used as a counter electrode. A ferrite anode was used as an auxiliary anode.

The electric current density was 25 A/dm$^2$ at a peak current value. The total amount of electric current at the time when the aluminum plate was used as the anode was 50 C/dm$^2$. Subsequently, the aluminum plate was washed with water by spraying.

(h) Alkaline Etching Treatment

The aluminum plate was etched by spraying it with an aqueous solution containing 26 mass % of caustic soda and 6.5 mass % of aluminum ions and kept at 32° C. Thereby, the aluminum plate was dissolved so that the amount of dissolved aluminum was 0.12 g/m$^2$. Smuts including as the main component aluminum hydroxide and occurred in the electrochemical surface-roughening treatment using AC current were removed and the edge regions of the resultant pits were dissolved to smoothen the edge regions. Subsequently, the aluminum plate was washed with water by spraying.

(i) Desmutting Treatment

The aluminum plate was desmutted by spraying it with an aqueous solution kept at a temperature of 60° C. and containing 25 mass % of sulfuric acid and 0.5 mass % of aluminum ions. The aluminum plate was then washed with water by spraying.

(j) Anodizing Treatment

The aluminum plate was anodized with an anodic oxidation apparatus that included first and second electrolysis units each having a length of 6 m, first and second power supply units each having a length of 3 m, and first and second power supply units each having a length of 2.4 m. The electrolytic solution supplied to the first and second electrolysis units included sulfuric acid. More specifically, the electrolytic solution was an aqueous solution containing 50 g/L of sulfuric acid and 0.5 mass % of aluminum ions and kept at a temperature of 20° C. The aluminum plate was then washed with water by spraying. The amount of the oxide layer thus prepared was 2.7 g/m$^2$.

Preparation and Evaluation of Planographic Printing Plate

The ink composition of Example 1 was discharged onto the aluminum support thus prepared and was cured in the same manner as in Example 1. Thus, a planographic printing plate was obtained and was evaluated as to the following items.

a. Evaluation of Image

Ink [VALUES-G red for sheets (manufactured by Dainippon Ink and Chemicals, Inc.)] and dampening water [ECOLITY 2 (manufactured by Fuji Photo Film)] were applied to the planographic printing plate with an image obtained by curing the ink composition, and the planographic printing plate was loaded in a HEIDEL KOR-D printing machine. The image was printed on 100 sheets of paper and the image on the 100th sheet was evaluated visually. It was confirmed that the image had no missing portion of the image region and no stain in the non-image region.

b. Evaluation of Printing Durability

The image on the planographic printing plate was further printed on sheets of paper. 10,000 or more prints having no missing portion of an image region and no stain in a non-image region could be obtained. This shows that the planographic printing plate had practically acceptable printing durability.

Example 8

The following components were stirred with a high-speed water cooling-type stirrer to obtain a cyan ink composition for UV ink jet recording.

| Composition of cyan ink | |
|---|---|
| Carboxy group-containing polymerizable compound A-6 | 12.0 parts |
| Alkylene oxide-containing compound B-1 (n is 9 on average) | 17.4 parts |
| ACTILANE 421 (*Acrylate monomer manufactured by Akcros Chemicals Ltd.)(other polymerizable compound) | 22.0 parts |
| PHOTOMER 2017 (UV diluent manufactured by EChem) | 20.0 parts |
| SOLSPERSE 32000 (Dispersant manufactured by Noveon Inc.) | 0.4 parts |
| IRGALITE BLUE BLVO (Pigment manufactured by Ciba Specialty Chemicals Ltd.)(colorant) | 3.6 parts |
| GENORAD 16 (Stabilizer manufactured by Rahn AG) | 0.05 parts |
| RAPI-CURE DVE-3 (Vinyl ether manufactured by ISP Europe)(other polymerizable compound) | 8.0 parts |
| LUCIRIN TPO (Photopolymerization initiator, manufactured by BASF Corporation) | 8.5 parts |
| Benzophenone (Photopolymerization initiator) | 4.0 parts |
| IRGACURE 184 (Photopolymerization initiator manufactured by Ciba Specialty Chemicals Ltd.) | 4.0 parts |
| BYK 307 (Antifoaming agent manufactured by BYK Chemie GmbH) | 0.05 parts |

<Evaluation of Ink>

The cyan ink composition was set in an ink jet recording apparatus. The ink was discharged onto a sheet made of polyvinyl chloride with the ink jet recording apparatus, and the sheet was irradiated with light by allowing the sheet to pass through the position under the iron-doped ultraviolet ray lamp (power of 120 W/cm$^2$) at a velocity of 40 m/min. The resultant printed matter having an image obtained by curing the ink composition was evaluated in the same manner as in Example 1. The results are shown in Table 2.

Example 9

The following components were stirred with a high-speed water cooling-type stirrer to obtain a magenta ink composition for UV ink jet recording.

| Composition of magenta ink | |
|---|---:|
| Carboxy group-containing polymerizable compound A-6 | 6.7 parts |
| Alkylene oxide-containing compound B-1 (n is 23 on average) | 6.7 parts |
| ACTILANE 421 (Acrylate monomer manufactured by Akcros Chemicals Ltd.) (other polymerizable compound) | 38.0 parts |
| PHOTOMER 2017 (UV diluent manufactured by EChem) | 20.0 parts |
| SOLSPERSE 32000 (Dispersant manufactured by Noveon Inc.) | 0.4 parts |
| CINQUASIA MAGENTA RT-355D (Pigment manufactured by Ciba Specialty Chemicals Ltd.)(colorant) | 3.6 parts |
| GENORAD 16 (Stabilizer manufactured by Rahn AG) | 0.05 parts |
| RAPI-CURE DVE-3 (Vinyl ether manufactured by ISP Europe)(other polymerizable compound) | 8.0 parts |
| LUCIRIN TPO (Photopolymerization initiator manufactured by BASF Corporation) | 8.5 parts |
| Benzophenone (Photopolymerization initiator) | 4.0 parts |
| IRGACURE 184 (Photopolymerization initiator manufactured by Ciba Specialty Chemicals Ltd.) | 4.0 parts |
| BYK 307 (Antifoaming agent manufactured by BYK Chemie GmbH) | 0.05 parts |

The magenta ink composition was set in an ink jet recording apparatus. The ink was discharged onto a sheet made of polyvinyl chloride with the ink jet recording apparatus, and the sheet was irradiated with light by allowing the sheet to pass through the position under the iron-doped ultraviolet ray lamp (power of 120 W/cm$^2$) at a velocity of 40 m/min. The resultant printed matter having an image obtained by curing the ink composition was evaluated in the same manner as in Example 1. The results are shown in Table 2.

Example 10

The following components were stirred with a high-speed water cooling-type stirrer to obtain a yellow ink composition for UV ink jet recording.

| Composition of yellow ink | |
|---|---:|
| Carboxy group-containing polymerizable compound A-6 | 12.7 parts |
| Alkylene oxide-containing compound B-10 (n is 4.5 on average) | 16.7 parts |
| ACTILANE 421 (Acrylate monomer manufactured by Akcros Chemicals Ltd.)(other polymerizable compound) | 30.0 parts |
| PHOTOMER 2017 (UV diluent manufactured by EChem) | 20.0 parts |
| SOLSPERSE 32000 (Dispersant manufactured by Noveon Inc.) | 0.4 parts |
| CROMOPHTAL YELLOW LA (Pigment manufactured by Ciba Specialty Chemicals Ltd.)(colorant) | 3.6 parts |
| GENORAD 16 (Stabilizer manufactured by Rahn AG) | 0.05 parts |
| LUCIRIN TPO (Photopolymerization initiator manufactured by BASF Corporation) | 8.5 parts |
| Benzophenone (Photopolymerization initiator) | 4.0 parts |
| IRGACURE 184 (Photopolymerization initiator manufactured by Ciba Specialty Chemicals Ltd.) | 4.0 parts |
| BYK 307 (Antifoaming agent manufactured by BYK Chemie GmbH) | 0.05 parts |

The yellow ink composition was set in an ink jet recording apparatus. The ink was discharged onto a sheet made of polyvinyl chloride with the ink jet recording apparatus, and the sheet was irradiated with light by allowing the sheet to pass through the position under the iron-doped ultraviolet ray lamp (power of 120 W/cm$^2$) at a velocity of 40 m/min. The resultant printed matter having an image obtained by curing the ink composition was evaluated in the same manner as in Example 1. The results are shown in Table 2.

Example 11

The following components were stirred with a high-speed water cooling-type stirrer to obtain a black ink composition for UV ink jet recording.

| Composition of black ink | |
|---|---:|
| Carboxy group-containing polymerizable compound A-1 | 9.4 parts |
| Alkylene oxide-containing compound B-12 (n is 6 on average) | 10.0 parts |
| ACTILANE 421 (Acrylate monomer manufactured by Akcros Chemicals Ltd.)(other polymerizable compound) | 36.0 parts |
| PHOTOMER 2017 (UV diluent manufactured by EChem) | 20.0 parts |
| SOLSPERSE 32000 (Dispersant manufactured by Noveon Inc.) | 0.4 parts |
| MICROLITH BLACK C-K (Pigment manufactured by Ciba Specialty Chemicals Ltd.)(colorant) | 2.6 parts |
| GENORAD 16 (Stabilizer manufactured by Rahn AG) | 0.05 parts |
| RAPI-CURE DVE-3 (Vinyl ether manufactured by ISP Europe)(other polymerizable compound) | 5.0 parts |
| LUCIRIN TPO (Photopolymerization initiator manufactured by BASF Corporation) | 8.5 parts |
| Benzophenone (Photopolymerization initiator) | 4.0 parts |
| IRGACURE 184 (Photopolymerization initiator manufactured by Ciba Specialty Chemicals Ltd.) | 4.0 parts |
| BYK 307 (Antifoaming agent manufactured by BYK Chemie GmbH) | 0.05 parts |

The black ink composition was set in an ink jet recording apparatus. The ink was discharged onto a sheet made of polyvinyl chloride with the ink jet recording apparatus, and the sheet was irradiated with light by allowing the sheet to pass through the position under the iron-doped ultraviolet ray lamp (power of 120 W/cm$^2$) at a velocity of 40 m/min. The resultant printed matter having an image obtained by curing the ink composition was evaluated in the same manner as in Example 1. The results are shown in Table 2.

Example 12

The following components were stirred with a high-speed water cooling-type stirrer to obtain a cyan ink composition for UV ink jet recording.

| Composition of cyan ink | |
|---|---:|
| Carboxy group-containing polymerizable compound A-7 | 10.7 parts |
| Alkylene oxide-containing compound B-1 (n is 9 on average) | 16.7 parts |
| ACTILANE 422 (* Acrylate monomer manufactured by Akcros Chemicals Ltd.)(other polymerizable compound) | 46.0 parts |
| SOLSPERSE 32000 (Dispersant manufactured by Noveon Inc.) | 0.4 parts |
| IRGALITE BLUE GLVO (Pigment manufactured by Ciba Specialty Chemicals Ltd.)(colorant) | 3.6 parts |
| GENORAD 16 (Stabilizer manufactured by Rahn AG) | 0.05 parts |
| RAPI-CURE DVE-2 (Vinyl ether manufactured by ISP Europe)(other polymerizable compound) | 6.0 parts |
| LUCIRIN TPO (Photopolymerization initiator manufactured by BASF Corporation) | 8.5 parts |

| Composition of cyan ink | |
|---|---|
| Benzophenone (Photopolymerization initiator) | 4.0 parts |
| IRGACURE 184 (Photopolymerization initiator manufactured by Ciba Specialty Chemicals Ltd.) | 4.0 parts |
| BYK 307 (Antifoaming agent manufactured by BYK Chemie GmbH) | 0.05 parts |

The cyan ink composition was set in an ink jet recording apparatus. The ink was discharged onto a sheet made of polyvinyl chloride with the ink jet recording apparatus, and the sheet was irradiated with light by allowing the sheet to pass through the position under the iron-doped ultraviolet ray lamp (power of 120 $W/cm^2$) at a velocity of 40 m/min. The resultant printed matter having an image obtained by curing the ink composition was evaluated in the same manner as in Example 1. The results are shown in Table 2.

The following components were stirred with a high-speed water cooling-type stirrer to obtain a cyan ink composition for UV ink jet recording.

| Composition of cyan ink | |
|---|---|
| Carboxyl group-containing polymerizable compound A-6 | 10.0 parts |
| Alkylene oxide-containing compound B-1 (n is 3 on average) | 20.0 parts |
| KAYARAD HDDA (* Acrylate monomer manufactured by Nippon Kayaku Co., Ltd.)(other polymerizable compound) | 2.6 parts |
| ACTILANE 421 (Acrylate monomer manufactured by Akcros Chemicals Ltd.)(other polymerizable compound) | 40.0 parts |
| SOLSPERSE 32000 (Dispersant manufactured by Noveon Inc.) | 0.4 parts |
| SOLSPERSE 5000 (Dispersant manufactured by Noveon Inc.) | 0.05 parts |
| IRGALITE BLUE GLVO (Pigment manufactured by Ciba Specialty Chemicals Ltd.)(colorant) | 1.4 parts |
| GENORAD 16 (Stabilizer manufactured by Rahn AG) | 0.05 parts |
| RAPI-CURE DVE-3 (Vinyl ether manufactured by ISP Europe)(other polymerizable compound) | 5.0 parts |
| LUCIRIN TPO (Photopolymerization initiator manufactured by BASF Corporation) | 8.0 parts |
| Benzophenone (Photopolymerization initiator) | 2.0 parts |
| IRGACURE 184 (Photopolymerization initiator manufactured by Ciba Specialty Chemicals Ltd.) | 4.0 parts |
| BYK 307 (Antifoaming agent manufactured by BYK Chemie GmbH) | 0.5 parts |

The cyan ink composition was set in an ink jet recording apparatus. The ink was discharged onto a sheet made of polyvinyl chloride with the ink jet recording apparatus, and the sheet was irradiated with light by allowing the sheet to pass through the position under the iron-doped ultraviolet ray lamp (power of 120 $W/cm^2$) at a velocity of 40 m/min. The resultant printed matter having an image obtained by curing the ink composition was evaluated in the same manner as in Example 1. The results are shown in Table 2.

Comparative Example 3

The following components were stirred with a high-speed water cooling-type stirrer to obtain a cyan ink composition for UV ink jet recording.

| Composition of cyan ink | |
|---|---|
| Alkylene oxide-containing compound B-1 (n is 9 on average) | 29.4 parts |
| ACTILANE 421 (Acrylate monomer manufactured by Akcros Chemicals Ltd.)(other polymerizable compound) | 22.0 parts |
| PHOTOMER 2017 (UV diluent manufactured by EChem) | 20.0 parts |
| SOLSPERSE 32000 (Dispersant manufactured by Noveon Inc.) | 0.4 parts |
| IRGALITE BLUE GLVO (Pigment manufactured by Ciba Specialty Chemicals Ltd.)(colorant) | 3.6 parts |
| GENORAD 16 (Stabilizer manufactured by Rahn AG) | 0.05 parts |
| RAPI-CURE DVE-3 (Vinyl ether manufactured by ISP Europe)(other polymerizable compound) | 8.0 parts |
| LUCIRIN TPO (Photopolymerization initiator manufactured by BASF Corporation) | 8.5 parts |
| Benzophenone (Photopolymerization initiator) | 4.0 parts |
| IRGACURE 184 (Photopolymerization initiator manufactured by Ciba Specialty Chemicals Ltd.) | 4.0 parts |
| BYK 307 (Antifoaming agent manufactured by BYK Chemie GmbH) | 0.05 parts |

The cyan ink composition was set in an ink jet recording apparatus. The ink was discharged onto a sheet made of polyvinyl chloride with the ink jet recording apparatus, and the sheet was irradiated with light by allowing the sheet to pass through the position under the iron-doped ultraviolet ray lamp (power of 120 $W/cm^2$) at a velocity of 40 m/min. The resultant printed matter having an image obtained by curing the ink composition was evaluated in the same manner as in Example 1. The results are shown in Table 2.

Comparative Example 4

The following components were stirred with a high-speed water cooling-type stirrer to obtain a cyan ink composition for UV ink jet recording.

| Composition of cyan ink | |
|---|---|
| ACTILANE 421 (Acrylate monomer manufactured by Akcros Chemicals Ltd.)(other polymerizable compound) | 51.4 parts |
| PHOTOMER 2017 (UV diluent manufactured by EChem) | 20.0 parts |
| SOLSPERSE 32000 (Dispersant manufactured by Noveon Inc.) | 0.4 parts |
| IRGALITE BLUE GLVO (Pigment manufactured by Ciba Specialty Chemicals Ltd.)(colorant) | 3.6 parts |
| GENORAD 16 (Stabilizer manufactured by Rahn AG) | 0.05 parts |
| RAPI-CURE DVE-3 (Vinyl ether manufactured Ciba Specialty Chemicals compound) | 8.0 parts |
| LUCIRIN TPO (Photopolymerization initiator manufactured by BASF Corporation) | 8.5 parts |
| Benzophenone (Photopolymerization initiator) | 4.0 parts |
| IRGACURE 184 (Photopolymerization initiator manufactured by Ciba Specialty Chemicals Ltd.) | 4.0 parts |
| BYK 307 (Antifoaming agent manufactured by BYK Chemie GmbH) | 0.05 parts |

The cyan ink composition was set in an ink jet recording apparatus. The ink was discharged onto a sheet made of polyvinyl chloride with the ink jet recording apparatus, and the sheet was irradiated with light by allowing the sheet to pass through the position under the iron-doped ultraviolet ray lamp (power of 120 $W/cm^2$) at a velocity of 40 m/min. The resultant printed matter having an image obtained by curing the ink composition was evaluated in the same manner as in Example 1. The results are shown in Table 2.

TABLE 2

| | Exposure (mJ/cm²) | Curability | Cross-hatch test | Folding test |
|---|---|---|---|---|
| Example 8 | 330 | Good | 4B | 4 |
| Example 9 | 330 | Good | 3B | 3 |
| Example 10 | 330 | Good | 4B | 4 |
| Example 11 | 330 | Good | 4B | 4 |
| Example 12 | 330 | Good | 4B | 4 |
| Example 13 | 330 | Good | 3B | 4 |
| Comparative Example 3 | 330 | Poor | — | — |
| Comparative Example 4 | 330 | Good | 2B | 2 |

As is clearly shown in Table 2, all of the ink compositions of Examples 8 to 13 were cured with high sensitivity, and enabled formation of image portions with an excellent curing property, strong adhesiveness to the sheet serving as a recording medium, and excellent flexibility.

On the other hand, it was confirmed that the ink composition of Comparative Example 3 that included no carboxyl group-containing polymerizable compound and included an alkylene oxide-containing compound and a bifunctional acrylate as polymerizable compounds had insufficient curability. In addition, the irradiated image still had wet portions in the finger test.

The ink composition of Comparative Example 4 that included neither carboxyl group-containing polymerizable compound nor alkylene oxide-containing polymerizable compound and included bifunctional acrylate as the main component thereof exhibited good curability, but the cured film had insufficient flexibility and adhesiveness, and therefore noticeable cracks, which are not practically acceptable, occurred in the cured film by folding the sheet.

Example 14

A planographic printing plate was prepared and printing durability thereof was evaluated, and an image obtained by using the planographic printing plate was evaluated in the same manner as in Example 7, except that the ink composition of Example 8 was used in stead of the ink composition of Example 7.

As a result, it was confirmed that the image on the 100th sheet had no missing portion of the image region and no stain in the non-image region. Moreover, 10,000 or more prints having no missing portion of an image region and no stain in a non-image region could be obtained. This shows that the planographic printing plate had practically acceptable printing durability.

Example 15

The following components were stirred with a high-speed water cooling-type stirrer to obtain a cyan ink composition for UV ink jet recording.

| Composition of cyan ink | |
|---|---|
| Acidic group-containing monofunctional (meth)acrylic acid derivative A-6 | 12.9 parts |
| Basic group-containing monofunctional (meth)acrylic acid derivative C-1 | 8.5 parts |
| ACTILANE 421 (Acrylate monomer manufactured by Akcros Chemicals Ltd.)(other polymerizable compound) | 30.0 parts |
| PHOTOMER 2017 (UV diluent manufactured by EChem) | 20.0 parts |
| SOLSPERSE 32000 (Dispersant manufactured by Noveon Inc.) | 0.4 parts |
| IRGALITE BLUE BLVO (Pigment manufactured by Ciba Specialty Chemicals Ltd.)(colorant) | 3.6 parts |
| GENORAD 16 (Stabilizer manufactured by Rahn AG) | 0.05 parts |
| RAPI-CURE DVE-3 (Vinyl ether manufactured by ISP Europe)(other polymerizable compound) | 8.0 parts |
| LUCIRIN TPO (Photopolymerization initiator manufactured by BASF Corporation) | 8.5 parts |
| Benzophenone (Photopolymerization initiator) | 4.0 parts |
| IRGACURE 184 (Photopolymerization initiator manufactured by Ciba Specialty Chemicals Ltd.) | 4.0 parts |
| BYK 307 (Antifoaming agent manufactured by BYK Chemie GmbH) | 0.05 parts |

<Evaluation of Ink>

The cyan ink composition was set in an ink jet recording apparatus. The ink was discharged onto a sheet made of polyvinyl chloride with the ink jet recording apparatus, and the sheet was irradiated with light by allowing the sheet to pass through the position under the iron-doped ultraviolet ray lamp (power of 120 W/cm²) at a velocity of 40 m/min. The resultant printed matter having an image obtained by curing the ink composition was evaluated in the same manner as in Example 1. The results are shown in Table 3.

Example 16

The following components were stirred with a high-speed water cooling-type stirrer to obtain a magenta ink composition for UV ink jet recording.

| Composition of magenta ink | |
|---|---|
| Acidic group-containing monofunctional (meth)acrylic acid derivative A-10 | 10.0 parts |
| Basic group-containing monofunctional (meth)acrylic acid derivative C-1 | 5.4 parts |
| ACTILANE 421 (Acrylate monomer manufactured by Akcros Chemicals Ltd.)(other polymerizable compound) | 36.0 parts |
| PHOTOMER 2017 (UV diluent manufactured by EChem) | 20.0 parts |
| SOLSPERSE 32000 (Dispersant manufactured by Noveon Inc.) | 0.4 parts |
| CINQUASIA MAGENTA RT-355D (Pigment manufactured by Ciba Specialty Chemicals Ltd.)(colorant) | 3.6 parts |
| GENORAD 16 (Stabilizer manufactured by Rahn AG) | 0.05 parts |
| RAPI-CURE DVE-3 (Vinyl ether manufactured by ISP Europe)(other polymerizable compound) | 8.0 parts |
| LUCIRIN TPO (Photopolymerization initiator manufactured by BASF Corporation) | 8.5 parts |
| Benzophenone (Photopolymerization initiator) | 4.0 parts |
| IRGACURE 184 (Photopolymerization initiator manufactured by Ciba Specialty Chemicals Ltd.) | 4.0 parts |
| BYK 307 (Antifoaming agent manufactured by BYK Chemie GmbH) | 0.05 parts |

<Evaluation of Ink>

The magenta ink composition was set in an ink jet recording apparatus. The ink was discharged onto a sheet made of polyvinyl chloride with the ink jet recording apparatus, and the sheet was irradiated with light by allowing the sheet to pass through the position under the iron-doped ultraviolet ray lamp (power of 120 W/cm²) at a velocity of 40 m/min. The resultant printed matter having an image obtained by curing the ink composition was evaluated in the same manner as in Example 1. The results are shown in Table 3.

Example 17

The following components were stirred with a high-speed water cooling-type stirrer to obtain a yellow ink composition for UV ink jet recording.

| Composition of yellow ink | |
|---|---|
| Acidic group-containing monofunctional (meth)acrylic acid derivative A-7 | 5.5 parts |
| Basic group-containing monofunctional (meth)acrylic acid derivative C-4 | 4.5 parts |
| ACTILANE 421 (Acrylate monomer manufactured by Akcros Chemicals Ltd.)(other polymerizable compound) | 45.4 parts |
| PHOTOMER 2017 (UV diluent manufactured by EChem) | 20.0 parts |
| SOLSPERSE 32000 (Dispersant manufactured by Noveon Inc.) | 0.4 parts |
| CROMOPHTAL YELLOW LA (Pigment manufactured by Ciba Specialty Chemicals Ltd.)(colorant) | 3.6 parts |
| GENORAD 16 (Stabilizer manufactured by Rahn AG) | 0.05 parts |
| RAPI-CURE DVE-3 (Vinyl ether manufactured by ISP Europe)(other polymerizable compound) | 4.0 parts |
| LUCIRIN TPO (Photopolymerization initiator manufactured by BASF Corporation) | 8.5 parts |
| Benzophenone (Photopolymerization initiator) | 4.0 parts |
| IRGACURE 184 (Photopolymerization initiator manufactured by Ciba Specialty Chemicals Ltd.) | 4.0 parts |
| BYK 307 (Antifoaming agent manufactured by BYK Chemie GmbH) | 0.05 parts |

<Evaluation of Ink>

The yellow ink composition was set in an ink jet recording apparatus. The ink was discharged onto a sheet made of polyvinyl chloride with the ink jet recording apparatus, and the sheet was irradiated with light by allowing the sheet to pass through the position under the iron-doped ultraviolet ray lamp (power of 120 W/cm$^2$) at a velocity of 40 m/min. The resultant printed matter having an image obtained by curing the ink composition was evaluated in the same manner as in Example 1. The results are shown in Table 3.

Example 18

The following components were stirred with a high-speed water cooling-type stirrer to obtain a black ink composition for UV ink jet recording.

| Composition of black ink | |
|---|---|
| Acidic group-containing monofunctional (meth)acrylic acid derivative A-6 | 14.7 parts |
| Basic group-containing monofunctional (meth)acrylic acid derivative C-1 | 9.7 parts |
| ACTILANE 421 (Acrylate monomer manufactured by Akcros Chemicals Ltd.)(other polymerizable compound) | 31.0 parts |
| PHOTOMER 2017 (UV diluent manufactured by EChem) | 20.0 parts |
| SOLSPERSE 32000 (Dispersant manufactured by Noveon Inc.) | 0.4 parts |
| MICROLITH BLACK C-K (Pigment manufactured by Ciba Specialty Chemicals Ltd.)(colorant) | 2.6 parts |
| GENORAD 16 (Stabilizer manufactured by Rahn AG) | 0.05 parts |
| RAPI-CURE DVE-3 (Vinyl ether manufactured by ISP Europe)(other polymerizable compound) | 5.0 parts |
| LUCIRIN TPO (Photopolymerization initiator manufactured by BASF Corporation) | 8.5 parts |
| Benzophenone (Photopolymerization initiator) | 4.0 parts |
| IRGACURE 184 (Photopolymerization initiator manufactured by Ciba Specialty Chemicals Ltd.) | 4.0 parts |
| BYK 307 (Antifoaming agent manufactured by BYK Chemie GmbH) | 0.05 parts |

<Evaluation of Ink>

The black ink composition was set in an ink jet recording apparatus. The ink was discharged onto a sheet made of polyvinyl chloride with the ink jet recording apparatus, and the sheet was irradiated with light by allowing the sheet to pass through the position under the iron-doped ultraviolet ray lamp (power of 120 W/cm$^2$) at a velocity of 40 m/min. The resultant printed matter having an image obtained by curing the ink composition was evaluated in the same manner as in Example 1. The results are shown in Table 3.

Example 19

The following components were stirred with a high-speed water cooling-type stirrer to obtain a cyan ink composition for UV ink jet recording.

| Composition of cyan ink | |
|---|---|
| Acidic group-containing monofunctional (meth)acrylic acid derivative A-6 | 14.2 parts |
| Basic group-containing monofunctional (meth)acrylic acid derivative C-6 | 12.2 parts |
| ACTILANE 422 (Acrylate monomer manufactured by Akcros Chemicals Ltd.)(other polymerizable compound) | 49.0 parts |
| SOLSPERSE 32000 (Dispersant manufactured by Noveon Inc.) | 0.4 parts |
| IRGALITE BLUE GLVO (Pigment manufactured by Ciba Specialty Chemicals Ltd.)(colorant) | 3.6 parts |
| GENORAD 16 (Stabilizer manufactured by Rahn AG) | 0.05 parts |
| RAPI-CURE DVE-2 (Vinyl ether manufactured by ISP Europe)(other polymerizable compound) | 6.0 parts |
| LUCIRIN TPO (Photopolymerization initiator manufactured by BASF Corporation) | 8.5 parts |
| Benzophenone (Photopolymerization initiator) | 4.0 parts |
| IRGACURE 184 (Photopolymerization initiator, manufactured by Ciba Specialty Chemicals Ltd.) | 4.0 parts |
| BYK 307 (Antifoaming agent manufactured by BYK Chemie GmbH) | 0.05 parts |

<Evaluation of Ink>

The cyan ink composition was set in an ink jet recording apparatus. The ink was discharged onto a sheet made of polyvinyl chloride with the ink jet recording apparatus, and the sheet was irradiated with light by allowing the sheet to pass through the position under the iron-doped ultraviolet ray lamp (power of 120 W/cm$^2$) at a velocity of 40 m/min. The resultant printed matter having an image obtained by curing the ink composition was evaluated in the same manner as in Example 1. The results are shown in Table 3.

Example 20

The following components were stirred with a high-speed water cooling-type stirrer to obtain a cyan ink composition for UV ink jet recording.

<Evaluation of Ink>

The cyan ink composition was set in an ink jet recording apparatus. The ink was discharged onto a sheet made of polyvinyl chloride with the ink jet recording apparatus, and the sheet was irradiated with light by allowing the sheet to pass through the position under the iron-doped ultraviolet ray lamp (power of 120 W/cm$^2$) at a velocity of 40 m/min. The resultant printed matter having an image obtained by curing the ink composition was evaluated in the same manner as in Example 1. The results are shown in Table 3.

Comparative Example 5

The following components were stirred with a high-speed water cooling-type stirrer to obtain a cyan ink composition for UV ink jet recording for comparison.

| Composition of cyan ink | |
|---|---|
| Acidic group-containing monofunctional (meth)acrylic acid derivative A-22 | 8.5 parts |
| Basic group-containing monofunctional (meth)acrylic acid derivative C-1 | 5.5 parts |
| KAYARAD HDDA (Acrylate monomer manufactured by Nippon Kayaku Co., Ltd.)(other polymerizable compound) | 2.6 parts |
| ACTILANE 421 (Acrylate monomer manufactured by Akcros Chemicals Ltd.)(other polymerizable compound) | 66.0 parts |
| SOLSPERSE 32000 (Dispersant manufactured by Noveon Inc.) | 0.4 parts |
| SOLSPERSE 5000 (Dispersant manufactured by Noveon Inc.) | 0.05 parts |
| IRGALITE BLUE GLVO (Pigment manufactured by Ciba Specialty Chemicals Ltd.)(colorant) | 1.4 parts |
| GENORAD 16 (Stabilizer manufactured by Rahn AG) | 0.05 parts |
| RAPI-CURE DVE-3 (Vinyl ether manufactured by ISP Europe: other polymerizable compounds) | 5.0 parts |
| LUCIRIN TPO (Photopolymerization initiator manufactured by BASF Corporation) | 8.0 parts |
| Benzophenone (Photopolymerization initiator) | 2.0 parts |
| IRGACURE 184 (Photopolymerization initiator manufactured by Ciba Specialty Chemicals Ltd.) | 4.0 parts |
| BYK 307 (Antifoaming agent manufactured by BYK Chemie GmbH) | 0.5 parts |

| Composition of cyan ink | |
|---|---|
| LIGHT ACRYLATE HOA-MS<br>(Acidic group-containing monofunctional (meth)acrylic acid derivative) | 21.4 parts |
| ACTILANE 421 (Acrylate monomer manufactured by Akcros Chemicals Ltd.)(other polymerizable compound) | 30.0 parts |
| PHOTOMER 2017 (UV diluent manufactured by EChem) | 20.0 parts |
| SOLSPERSE 32000 (Dispersant manufactured by Noveon Inc.) | 0.4 parts |
| IRGALITE BLUE GLVO (Pigment manufactured by Ciba Specialty Chemicals Ltd.)(colorant) | 3.6 parts |
| GENORAD 16 (Stabilizer manufactured by Rahn AG) | 0.05 parts |
| RAPI-CURE DVE-3 (Vinyl ether manufactured by ISP Europe)(other polymerizable compound) | 8.0 parts |
| LUCIRIN TPO (Photopolymerization initiator manufactured by BASF Corporation) | 8.5 parts |
| Benzophenone (Photopolymerization initiator) | 4.0 parts |
| IRGACURE 184 (Photopolymerization initiator manufactured by Ciba Specialty Chemicals Ltd.) | 4.0 parts |
| BYK 307 (Antifoaming agent manufactured by BYK Chemie GmbH) | 0.05 parts |

LIGHT ACRYLATE HOA-MS is lauryl acrylate (monofunctional acrylate) manufactured by Kyoeisya Chemical, Col, Ltd.

<Evaluation of Ink>

The cyan ink composition was set in an ink jet recording apparatus. The ink was discharged onto a sheet made of polyvinyl chloride with the ink jet recording apparatus, and the sheet was irradiated with light by allowing the sheet to pass through the position under the iron-doped ultraviolet ray lamp (power of 120 W/cm$^2$) at a velocity of 40 m/min. The resultant printed matter having an image obtained by curing the ink composition was evaluated in the same manner as in Example 1. The results are shown in Table 3.

Comparative Example 6

The following components were stirred with a high-speed water cooling-type stirrer to obtain a cyan ink composition for UV ink jet recording.

TABLE 3

| | Totalizing Exposure (mJ/cm$^2$) | Curability | Adhesiveness (cross-hatch test) | Folding test |
|---|---|---|---|---|
| Example 15 | 330 | Good | 4B | 4 |
| Example 16 | 330 | Good | 3B | 4 |
| Example 17 | 330 | Good | 4B | 4 |
| Example 18 | 330 | Good | 4B | 3 |
| Example 19 | 330 | Good | 3B | 3 |
| Example 20 | 330 | Good | 4B | 3 |
| Comparative Example 5 | 330 | Poor | — | — |
| Comparative Example 6 | 330 | Good | 1B | 1 |

As is clearly shown in Table 3, all of the ink compositions of Examples 15 to 20 were cured with high sensitivity, and

| Composition of cyan ink | |
|---|---|
| ACTILANE 421<br>(Acrylate monomer manufactured by Akcros Chemicals Ltd.)(other polymerizable compound) | 51.4 parts |
| PHOTOMER 2017 (UV diluent manufactured by EChem) | 20.0 parts |
| SOLSPERSE 32000 (Dispersant manufactured by Noveon Inc.) | 0.4 parts |
| IRGALITE BLUE GLVO (Pigment manufactured by Ciba Specialty Chemicals Ltd.)(colorant) | 3.6 parts |
| GENORAD 16 (Stabilizer manufactured by Rahn AG) | 0.05 parts |
| RAPI-CURE DVE-3 (Vinyl ether manufactured by ISP Europe)(other polymerizable compound) | 8.0 parts |
| LUCIRIN TPO (Photopolymerization initiator manufactured by BASF Corporation) | 8.5 parts |
| Benzophenone (Photopolymerization initiator) | 4.0 parts |
| IRGACURE 184 (Photopolymerization initiator manufactured by Ciba Specialty Chemicals Ltd.) | 4.0 parts |
| BYK 307 (Antifoaming agent manufactured by BYK Chemie GmbH) | 0.05 parts |

The cyan ink composition was set in an ink jet recording apparatus. The ink was discharged onto a sheet made of polyvinyl chloride with the ink jet recording apparatus, and the sheet was irradiated with light by allowing the sheet to pass through the position under the iron-doped ultraviolet ray lamp (power of 120 W/cm$^2$) at a velocity of 40 m/min. The resultant printed matter having an image obtained by curing the ink composition was evaluated in the same manner as in Example 1. The results are shown in Table 3.

enabled formation of image portions with an excellent curing property, strong adhesiveness to the sheet serving as a recording medium, and excellent flexibility.

On the other hand, it was confirmed that the ink composition of Comparative Example 5 which included no monofunctional (meth)acrylic acid derivative containing a basic group and included a monofunctional (meth)acrylic acid derivative containing an acidic group and a bifunctional acrylate as polymerizable compounds had insufficient curability.

The ink composition of Comparative Example 6 that included neither a monofunctional (meth)acrylic acid derivative containing an acidic group nor a monofunctional (meth)acrylic acid derivative containing a basic group and included bifunctional acrylate as the main component thereof exhibited good curability, but the cured film had insufficient flexibility and adhesiveness, and therefore noticeable cracks, which are not practically acceptable, occurred in the cured film by folding the sheet.

Example 21

A planographic printing plate was prepared and printing durability thereof was evaluated, and an image obtained by using the planographic printing plate was evaluated in the same manner as in Example 7, except that the ink composition of Example 15 was used in stead of the ink composition of Example 7.

As a result, it was confirmed that the image on the 100th sheet had no missing portion of the image region and no stain in the non-image region. Moreover, 10,000 or more prints having no missing portion of an image region and no stain in a non-image region could be obtained. This shows that the planographic printing plate had practically acceptable printing durability.

Example 22

The following components were stirred with a high-speed water cooling-type stirrer to obtain a cyan ink composition for UV ink jet recording.

| | |
|---|---|
| Specific monomer C-5 | 12.5 parts |
| ACTILANE 421 (Acrylate monomer, manufactured by Akcros Chemicals Ltd.) | 30.0 parts |
| PHOTOMER 2017 (UV diluent manufactured by EChem) | 28.9 parts |
| SOLSPERSE 32000 (Dispersant manufactured by Noveon Inc.) | 0.4 parts |
| IRGALITE BLUE BLVO (Pigment manufactured by Ciba Specialty Chemicals Ltd.) | 3.6 parts |
| GENORAD 16 (Stabilizer manufactured by Rahn AG) | 0.05 parts |
| RAPI-CURE DVE-3 (Vinyl ether manufactured by ISP Europe) | 8.0 parts |
| LUCIRIN TPO (Photopolymerization initiator manufactured by BASF Corporation) | 8.5 parts |
| Benzophenone (Photopolymerization initiator) | 4.0 parts |
| IRGACURE 184 (Photopolymerization initiator manufactured by Ciba Specialty Chemicals Ltd.) | 4.0 parts |
| BYK 307 (Antifoaming agent manufactured by BYK Chemie GmbH) | 0.05 parts |

The cyan ink composition was set in an ink jet recording apparatus. The ink was discharged onto a sheet made of polyvinyl chloride with the ink jet recording apparatus, and the sheet was irradiated with light by allowing the sheet to pass through the position under the iron-doped ultraviolet ray lamp (power of 120 W/cm$^2$) at a velocity of 40 m/min. The resultant printed matter having an image obtained by curing the ink composition was evaluated in the same manner as in Example 1. The results are shown in Table 4.

Example 23

The following components were stirred with a high-speed water cooling-type stirrer to obtain a magenta ink composition for UV ink jet recording.

| | |
|---|---|
| Specific monomer C-1 | 10.4 parts |
| ACTILANE 421 (Acrylate monomer manufactured by Akcros Chemicals Ltd.) | 36.0 parts |
| PHOTOMER 2017 (UV diluent manufactured by EChem) | 25.0 parts |
| SOLSPERSE 32000 (Dispersant manufactured by Noveon Inc.) | 0.4 parts |
| CINQUASIA MAGENTA RT-355D (Pigment manufactured by Ciba Specialty Chemicals Ltd.) | 3.6 parts |
| GENORAD 16 (Stabilizer manufactured by Rahn AG) | 0.05 parts |
| RAPI-CURE DVE-3 (Vinyl ether manufactured by ISP Europe) | 8.0 parts |
| LUCIRIN TPO (Photopolymerization initiator manufactured by BASF Corporation) | 8.5 parts |
| Benzophenone (Photopolymerization initiator) | 4.0 parts |
| IRGACURE 184 (Photopolymerization initiator manufactured by Ciba Specialty Chemicals Ltd.) | 4.0 parts |
| BYK 307 (Antifoaming agent manufactured by BYK Chemie GmbH) | 0.05 parts |

The magenta ink composition was set in an ink jet recording apparatus. The ink was discharged onto a sheet made of polyvinyl chloride with the ink jet recording apparatus, and the sheet was irradiated with light by allowing the sheet to pass through the position under the iron-doped ultraviolet ray lamp (power of 120 W/cm$^2$) at a velocity of 40 m/min. The resultant printed matter having an image obtained by curing the ink composition was evaluated in the same manner as in Example 1. The results are shown in Table 4.

Example 24

The following components were stirred with a high-speed water cooling-type stirrer to obtain a yellow ink composition for UV ink jet recording.

| | |
|---|---|
| Specific monomer C-6 | 10.0 parts |
| ACTILANE 421 (Acrylate monomer manufactured by Akcros Chemicals Ltd.) | 45.4 parts |
| PHOTOMER 2017 (UV diluent manufactured by EChem) | 20.0 parts |
| SOLSPERSE 32000 (Dispersant manufactured by Noveon Inc.) | 0.4 parts |
| CROMOPHTAL YELLOW LA (Pigment manufactured by Ciba Specialty Chemicals Ltd.) | 3.6 parts |
| GENORAD 16 (Stabilizer manufactured by Rahn AG) | 0.05 parts |
| RAPI-CURE DVE-3 (Vinyl ether manufactured by ISP Europe) | 4.0 parts |
| LUCIRIN TPO (Photopolymerization initiator manufactured by BASF Corporation) | 8.5 parts |
| Benzophenone (Photopolymerization initiator) | 4.0 parts |
| IRGACURE 184 (Photopolymerization initiator manufactured by Ciba Specialty Chemicals Ltd.) | 4.0 parts |
| BYK 307 (Antifoaming agent manufactured by BYK Chemie GmbH) | 0.05 parts |

The yellow ink composition was set in an ink jet recording apparatus. The ink was discharged onto a sheet made of polyvinyl chloride with the ink jet recording apparatus, and the sheet was irradiated with light by allowing the sheet to pass through the position under the iron-doped ultraviolet ray lamp (power of 120 W/cm$^2$) at a velocity of 40 m/min. The resultant printed matter having an image obtained by curing the ink composition was evaluated in the same manner as in Example 1. The results are shown in Table 4.

Example 25

The following components were stirred with a high-speed water cooling-type stirrer to obtain a black ink composition for UV ink jet recording.

| | |
|---|---|
| Specific monomer C-10 | 19.7 parts |
| ACTILANE 421 (Acrylate monomer manufactured by Akcros Chemicals Ltd.) | 35.7 parts |
| PHOTOMER 2017 (UV diluent manufactured by EChem) | 20.0 parts |
| SOLSPERSE 32000 (Dispersant manufactured by Noveon Inc.) | 0.4 parts |
| MICROLITH BLACK C-K (Pigment manufactured by Ciba Specialty Chemicals Ltd.) | 2.6 parts |
| GENORAD 16 (Stabilizer manufactured by Rahn AG) | 0.05 parts |
| RAPI-CURE DVE-3 (Vinyl ether manufactured by ISP Europe) | 5.0 parts |
| LUCIRIN TPO (Photopolymerization initiator manufactured by BASF Corporation) | 8.5 parts |
| Benzophenone (Photopolymerization initiator) | 4.0 parts |
| IRGACURE 184 | 4.0 parts |
| BYK 307 (Antifoaming agent manufactured by BYK Chemie GmbH) | 0.05 parts |

The black ink composition was set in an ink jet recording apparatus. The ink was discharged onto a sheet made of polyvinyl chloride with the ink jet recording apparatus, and the sheet was irradiated with light by allowing the sheet to pass through the position under the iron-doped ultraviolet ray lamp (power of 120 W/cm$^2$) at a velocity of 40 m/min. The resultant printed matter having an image obtained by curing the ink composition was evaluated in the same manner as in Example 1. The results are shown in Table 4.

| | Totalizing exposure (mJ/cm$^2$) | Curability | Adhesiveness | Folding test |
|---|---|---|---|---|
| Example 22 | 330 | Good | 4B | 5 |
| Example 23 | 330 | Good | 4B | 4 |

-continued

| | Totalizing exposure (mJ/cm$^2$) | Curability | Adhesiveness | Folding test |
|---|---|---|---|---|
| Example 24 | 330 | Good | 3B | 5 |
| Example 25 | 330 | Good | 4B | 5 |

What is claimed is:

1. An ink composition comprising:
   a polymerization initiator; and
   at least one compound selected from the group consisting of (meth)acrylic acid and monofunctional (meth)acrylic acid esters and amides each having a carboxy group in a molecule.

2. The ink composition of claim 1, further comprising a colorant.

3. The ink composition of claim 1, which is an ink composition for ink jet recording.

4. An ink jet recording method, comprising:
   (a) discharging the ink composition of claim 1 onto a recording medium; and
   (b) irradiating the ink composition with active radiation rays to cure the ink composition.

5. A method for producing a planographic printing plate, comprising:
   (a) discharging the ink composition of claim 1 onto a hydrophilic support; and
   (b) irradiating the ink composition with active radiation rays to cure the ink composition to form a hydrophobic image on the hydrophilic support.

6. A planographic printing plate, which is produced by the method of claim 5.

7. An ink composition comprising:
   a polymerization initiator;
   at least one compound selected from the group consisting of (meth)acrylic acid and monofunctional (meth)acrylic acid esters and amides each having a carboxy group in a molecule; and
   a monofunctional (meth)acrylic acid ester or amide having an alkylene oxide repeating unit in a molecule.

8. The ink composition of claim 7, further comprising a colorant.

9. The ink composition of claim 7, which is an ink composition for ink jet recording.

10. An ink jet recording method, comprising:
    (a) discharging the ink composition of claim 7 onto a recording medium; and (b) irradiating the ink composition with active radiation rays to cure the ink composition.

11. A method for producing a planographic printing plate, comprising:
   (a) discharging the ink composition of claim 7 onto a hydrophilic support; and
   (b) irradiating the ink composition with active radiation rays to cure the ink composition to form a hydrophobic image on the hydrophilic support.

12. A planographic printing plate, which is produced by the method of claim 11.

13. An ink composition comprising:
   a polymerization initiator; and
   a monofunctional (meth)acrylic acid ester or amide having a basic group in a molecule.

14. The ink composition of claim 13, further comprising at least one compound selected from the group consisting of (meth)acrylic acid and monofunctional (meth)acrylic acid esters and amides each having an acidic group in a molecule.

15. The ink composition of claim 13, further comprising a colorant.

16. The ink composition of claim 13, which is an ink composition for ink jet recording.

17. An ink jet recording method, comprising:
   (a) discharging the ink composition of claim 13 onto a recording medium; and
   (b) irradiating the ink composition with active radiation rays to cure the ink composition.

18. A method for producing a planographic printing plate, comprising:
   (a) discharging the ink composition of claim 13 onto a hydrophilic support; and
   (b) irradiating the ink composition with active radiation rays to cure the ink composition to form a hydrophobic image on the hydrophilic support.

19. A planographic printing plate, which is produced by the method of claim 18.

20. The ink composition of claim 1 comprising at least the monofunctional (meth)acrylic acid esters and amides each having a carboxy group in a molecule, wherein the monofunctional (meth)acrylic acid esters and amides each having a carboxy group in a molecule are a compound represented by the following Formula (I):

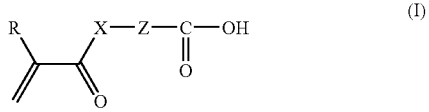

wherein R represents a hydrogen atom or a methyl group; X represents an oxygen atom or NR', wherein R' represents a hydrogen atom or an alkyl group; and Z represents a divalent organic group.

* * * * *